US011025132B2

(12) United States Patent
Edwards et al.

(10) Patent No.: US 11,025,132 B2
(45) Date of Patent: Jun. 1, 2021

(54) CASE FOR A SERVOMOTOR

(71) Applicant: 2576150 ONTARIO CORP., Toronto (CA)

(72) Inventors: Jonathan Edwards, Toronto (CA); Daniel Kitchen, Woodville (CA)

(73) Assignee: 2576150 ONTARIO CORP., Toronto (CA)

(*) Notice: Subject to any disclaimer, the term of this patent is extended or adjusted under 35 U.S.C. 154(b) by 0 days.

(21) Appl. No.: 16/249,406

(22) Filed: Jan. 16, 2019

(65) Prior Publication Data

US 2019/0222094 A1  Jul. 18, 2019

Related U.S. Application Data

(60) Provisional application No. 62/617,840, filed on Jan. 16, 2018.

(51) Int. Cl.
| | |
|---|---|
| *H02K 7/00* | (2006.01) |
| *H02K 5/22* | (2006.01) |
| *F16D 1/108* | (2006.01) |
| *F16D 1/10* | (2006.01) |

(52) U.S. Cl.
CPC ............. *H02K 7/003* (2013.01); *F16D 1/108* (2013.01); *H02K 5/22* (2013.01); *H02K 5/225* (2013.01); *F16D 2001/102* (2013.01); *F16D 2001/103* (2013.01)

(58) Field of Classification Search
CPC . H02K 5/22; H02K 5/225; H02K 7/03; F16D 1/108; F16D 1/116; F16D 2001/102; F16D 2001/103; B62D 5/04; B62D 5/0403; B62D 57/02; B62D 57/022; B62D 57/028; B62D 57/032

USPC .............. 310/71, 75 R, 89; 384/96, 107, 127
See application file for complete search history.

(56) References Cited

U.S. PATENT DOCUMENTS

| | | | | |
|---|---|---|---|---|
| 5,839,320 | A | * 11/1998 | Komachi | ................. H02K 5/08 |
| | | | | 74/425 |
| 6,204,582 | B1 | 3/2001 | Keller | |
| 7,559,129 | B2 | 7/2009 | Pettey | |
| 7,750,517 | B2 | 7/2010 | Pettey | |
| 7,795,768 | B2 | 9/2010 | Pettey | |
| 7,859,151 | B2 | 12/2010 | Pettey | |
| 7,891,902 | B2 | 2/2011 | Pettey | |
| 7,934,691 | B2 | 5/2011 | Pettey | |
| 8,324,773 | B2 | 12/2012 | Pettey | |
| 8,791,663 | B2 | 7/2014 | Pettey | |
| 8,816,553 | B2 | 8/2014 | Pettey | |
| 2004/0193318 | A1* | 9/2004 | Ito | .............................. B25J 9/06 |
| | | | | 700/245 |

(Continued)

FOREIGN PATENT DOCUMENTS

WO   2016189309   12/2016

*Primary Examiner* — Tulsidas C Patel
*Assistant Examiner* — Rashad H Johnson
(74) *Attorney, Agent, or Firm* — Tucker Ellis LLP

(57) ABSTRACT

The present invention relates to a case for a servomotor having a rotatable output shaft, wherein the case comprises at least a partial interior volume or enclosure for enclosing at least a portion of the servo; a front end having a front face; and a front rotatable disc located at the front end, at least a portion of the front rotatable disc projecting out from the front face, the front rotatable disc configured to directly or indirectly functionally engage the output shaft and to be rotated thereby.

23 Claims, 33 Drawing Sheets

(56) References Cited

U.S. PATENT DOCUMENTS

| | | | |
|---|---|---|---|
| 2007/0188031 A1* | 8/2007 | Shu | H02K 7/02 310/74 |
| 2008/0224575 A1 | 9/2008 | Taya | |
| 2009/0149109 A1* | 6/2009 | Yoneda | G05B 19/41805 446/90 |
| 2009/0247045 A1 | 10/2009 | Pettey | |
| 2014/0097716 A1* | 4/2014 | Yamamoto | H02K 5/124 310/89 |
| 2014/0292162 A1 | 10/2014 | Pettey | |
| 2014/0338436 A1* | 11/2014 | Camp | G01B 5/0025 73/117.02 |
| 2014/0360298 A1* | 12/2014 | Wei | H02K 7/116 74/421 A |
| 2016/0006315 A1* | 1/2016 | Winterer | H02K 5/10 310/64 |
| 2016/0185405 A1* | 6/2016 | Takanishi | B25J 9/08 180/8.3 |
| 2018/0170466 A1* | 6/2018 | Enoch | B62D 57/032 |

\* cited by examiner

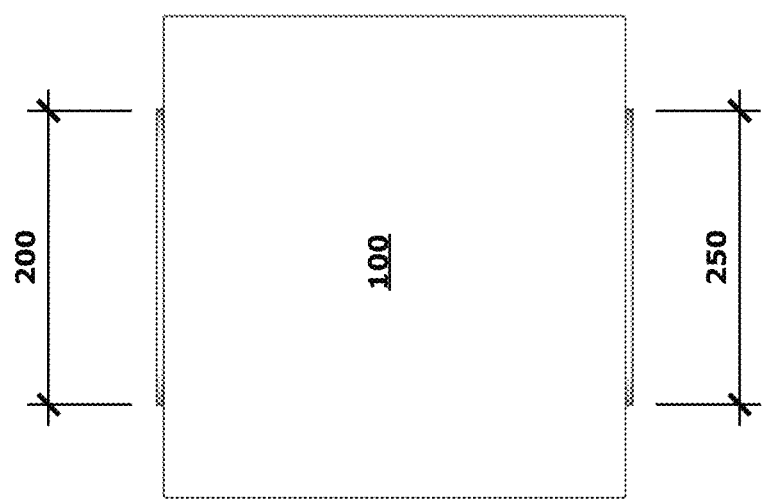

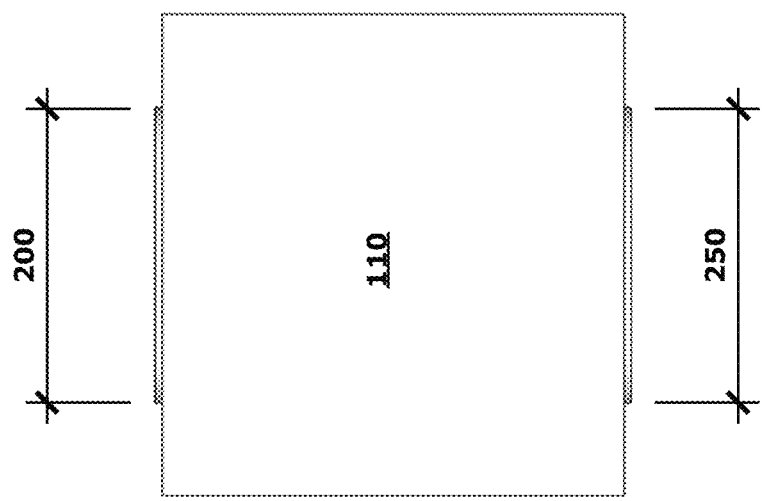

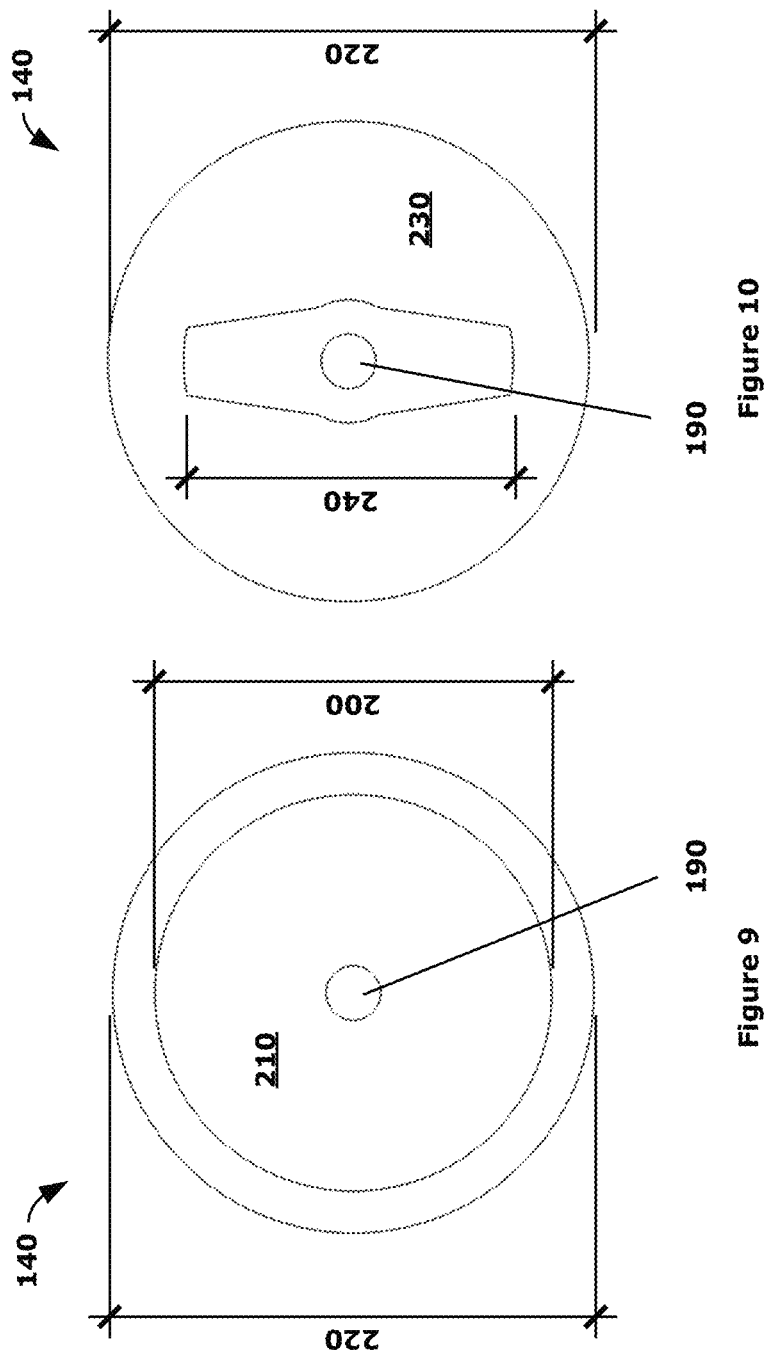

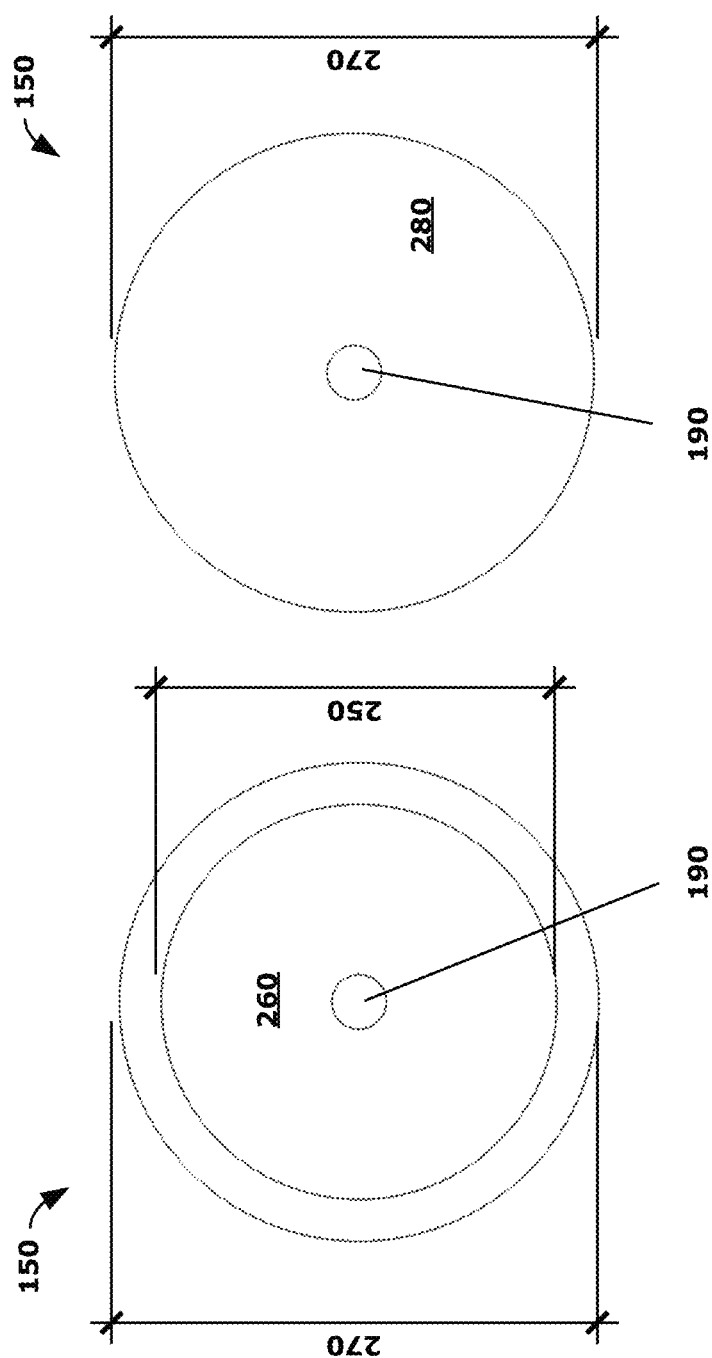

CASE FOR A SERVOMOTOR

RELATED APPLICATION DATA

This application claims the benefit of U.S. Provisional Patent Application No. 62/617,840, filed Jan. 16, 2018, the disclosure of which is incorporated herein by reference in its entirety.

FIELD OF THE INVENTION

The present invention generally relates to the mechanical industry and more specifically relates to a case for a servomotor.

BACKGROUND OF THE INVENTION

A servomotor or "servo" is a device normally consisting of an electric motor, a reduction gear set that is adapted to a potentiometer, an amplifier, a rotatable output shaft and an injection molded housing with case screws. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo housing and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servos that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but not limited to, hobby robotic applications and radio-controlled model vehicles (cars, planes, boats, etc.). Hobby servos are provided by several companies, including Futaba Corporation of America located in Schaumburg, Ill. and Hitec RCD USA, Inc., located in Poway, Calif. Examples of hobby servo makes and models provided by Futaba and Hitec are the Futaba S-148 Standard Precision Servo and the Hitec HS-81 Standard Micro Servo.

The output shaft of a hobby servo is typically capable of traveling approximately 180° (possibly up to 210° or more depending on manufacturer). Rotation of the hobby servo output shaft is limited typically by one or more internal mechanical stops. It is also typically true that the output shaft of a hobby servo is capable of producing a relatively limited amount of torque power. The torque and rotational limitations of a hobby servo are adequate for many hobby applications, such as model car steering control, puppet control, robot arm, leg or head movement and/or model airplane rudder control.

Ridges (or teeth) are typically distributed around the outside surface of the output shaft of a servo. Thus, the servo has a "male" spline configuration. Mechanisms to be driven by the output shaft must have a corresponding "female" spline receiver adapted to engage the output shaft. For example, a gear having a toothed receiver portion may be engaged to the output shaft of a hobby servo. Alternatively, servos may come with various shaped servo "arms" or "horns" having an inner diameter with gear teeth that correspond to the servo output shaft gear teeth. Currently, it can be difficult to engage a device that does not include a "female" spline configuration matching the "male" spline configuration of the output shaft of the servo or does not include a "female" configuration matching the configuration of the servo arm/horn.

Further, some applications require that shafts (i.e., axles, rods, beams, etc.) be driven (e.g., rotated) by a servo. These shafts might be round and/or smooth, but could have a different shape (e.g., polygonal like triangle, square, etc.). Driving any shaft, regardless of shape, with the output shaft of a hobby servo presents challenges at least because the output shaft is typically not very durable. For some applications, there is a need to engage a shaft to the output shaft of a servo such that the shaft can be driven (e.g., rotated) in line with the output shaft.

Another restriction associated with servos, is a lack of mechanical capacity. Servos are used in a variety of applications, some of which consist of applying heavy loads to the output shaft. In many cases, in addition to rotational loads, lateral forces which are perpendicular to the output shaft may be applied. Some loads which may be within the rotational capacity of the servo output shaft may nonetheless apply lateral forces exceeding the strength of the output shaft. In some cases, damage such as shaft distortion or breakage may result. As such, there is a need for means to improve the mechanical capacity and durability associated with servos.

Conventional servo housings are box-shaped, and have two mounting tabs with predrilled holes for mounting the servos in a vertical position. There are also servo housings that have mounting tabs for mounting the servos horizontally. However, being able to only mount the servo in a vertical or horizontal position severely limits the options available for transferring the rotational movement of the output shaft of the servo in different directions to associated structures. It is common to provide a case or block for the servo, that either encloses at least a portion of the servo or the servo components, that provides more options for mounting the servo and for transferring the rotational movement of the output shaft in different directions to additional substrates or component structures that are associated with the case or block by connection thereto. It is also common to provide various attachments to the output shaft of the servo that provide more options for transferring the rotational movement of the output shaft in different directions to additional substrates or component structures that are associated with the attachments by connection thereto.

A disadvantage of cases, blocks and attachments for servos in the prior art is that they merely provide a mounting solution where in the way in which the mount itself is then attached or mounted to additional substrates or component structures, and the visual appeal, is limited by the pre-set hole patterns and mounting options already provided on the cases, blocks and attachments themselves.

SUMMARY OF THE INVENTION

It is an object of the present invention to provide a case for a servo that overcomes disadvantages of cases, blocks and attachments for servos found in the prior art.

It is also an object of the present invention to provide a case for a servo that provides the user with virtually an unlimited number of options for attaching or mounting the case to additional substrates or component structures.

It is a further object of the present invention to provide a case for a servo which is configured as a building module capable of movement, which module can be configured from a simple module, wherein movement, such as rotational and/or linear movement, can be implemented through the module and that connection of the module with other components, such as other building modules, to create a building system, can be provided through simple assembly without requiring additional connecting components or additional process steps.

In accordance with an aspect of the present invention, there is provided a case for enclosing at least a portion of a servo having an output shaft, the case configured as a moveable module comprising at least one mechanical component configured to directly or indirectly functionally engage the output shaft, the at least one mechanical component required for movement of at least a portion of the moveable module, wherein when at least a portion of the servo is enclosed by the moveable module, the at least one mechanical component is directly or indirectly functionally engaged with the output shaft, and the servo is actuated to move the output shaft, the at least one mechanical component is moved by the output shaft.

In an embodiment of the present invention, the moveable module further comprises a servo wherein the moveable module encloses at least a portion of the servo.

In an embodiment of the present invention, the moveable module is randomly connectable with at least one other component through their respective adjacent surfaces, which connection facilitates movement between the moveable module and the adjacent at least one other component.

In an embodiment of the present invention, the respective adjacent surfaces are flat lateral surfaces.

In an embodiment of the present invention, the at least one other component is at least one active module.

In an embodiment of the present invention, the at least one other component is a moveable module.

In an embodiment of the present invention, the at least one other component is a passive module.

In accordance with another aspect of the present invention, there is provided a modular building system comprising connectable modules, the modular building system comprising at least one case for enclosing at least a portion of a servo having an output shaft, the case configured as a moveable module comprising at least one mechanical component configured to directly or indirectly functionally engage the output shaft, the at least one mechanical component required for movement of at least a portion of the moveable module, wherein when at least a portion of the servo is enclosed by the moveable module, the at least one mechanical component is directly or indirectly functionally engaged with the output shaft, and the servo is actuated to move the output shaft, the at least one mechanical component is moved by the output shaft, wherein the at least one moveable module is randomly connectable with at least one other module, wherein the modules are connectable through their respective adjacent surfaces which connection facilitates movement between adjacent modules.

In an embodiment of the present invention, the respective adjacent surfaces are flat lateral surfaces are provided for connection with other modules.

In an embodiment of the present invention, the at least one moveable module is configured independently from at least one of the other modules.

In an embodiment of the present invention, the at least one moveable module further comprises a servo wherein the at least one moveable module encloses at least a portion of the servo.

In an embodiment of the present invention, at least one of the other modules is an active module.

In an embodiment of the present invention, at least one of the other modules is a moveable module.

In an embodiment of the present invention, at least one of the other modules is a passive module.

In an embodiment of the present invention, at least one passive module facilitates movement between adjacent modules.

In an embodiment of the present invention, the at least one moveable module comprises a servo, wherein at least one module that is connected to the at least one moveable module is moved when the servo of the at least one moveable module is actuated to move the output shaft.

In an embodiment of the present invention, the at least one moveable module comprises a servo, wherein at least two modules that are connected together are moved by the at least one moveable module when the servo is actuated to move the output shaft.

In an embodiment of the present invention, the at least one mechanical component is rotatably arranged on the moveable module.

In an embodiment of the present invention, the at least one mechanical component comprises a rotatable component.

In an embodiment of the present invention, the at least one mechanical component comprises two rotatable components.

In an embodiment of the present invention, the rotatable components are cylindrical.

In an embodiment of the present invention, the rotatable components are discs.

In an embodiment of the present invention, at least one other module is connectable to the at least one moveable module.

In an embodiment of the present invention, the at least one other module is an active module.

In an embodiment of the present invention, the at least one other module is another moveable module.

In an embodiment of the present invention, the movement parameters are variable directly at the at least one moveable module.

In an embodiment of the present invention, wherein at least one passive module is connected to the at least one moveable module.

In accordance with another aspect of the present invention, there is provided a case for a servo having an output shaft, the case configured as a modular unit comprising: a plurality of sides that form an interior volume or enclosure for enclosing at least a portion of the servo, wherein each side of the plurality of sides includes an outer surface; and at least one functional member for directly or indirectly functionally engaging the output shaft, wherein at least a portion of the at least one functional member extends through at least one side of the plurality of sides and beyond the outer surface thereof.

In an embodiment of the present invention, when the modular unit encloses at least a portion of the servo, at least a portion of the servo is enclosed by the interior volume or enclosure, the at least one functional member is directly or indirectly functionally engaged with the output shaft, and the servo is actuated to move the shaft, the at least one functional member moves with the shaft.

In an embodiment of the present invention, the at least one functional member operably connects the modular unit with an adjacent component when the at least one functional member is operably connected to an adjacent face of the adjacent component.

In an embodiment of the present invention, when the at least one functional member is operably connected to an adjacent face of the adjacent component, the at least one functional member is capable of transferring movement from itself to the adjacent component.

In an embodiment of the present invention, the plurality of sides are configured in two interconnecting halves capable of interconnectivity.

In an embodiment of the present invention, at least a portion of the at least one functional member is disposed in a track within the interior volume or enclosure.

In an embodiment of the present invention, the modular unit is a construction modular unit.

In an embodiment of the present invention, the modular unit is an educational construction modular unit.

In an embodiment of the present invention, the modular unit is toy construction modular unit.

In accordance with another aspect of the present invention, there is provided a case for a servo having an output shaft, the case configured as a functionable construction block, the block comprising an enclosure for enclosing at least a portion of the servo, the servo for causing the block to perform a unique and specific behaviour, and a functional member configured to directly or indirectly functionally engage the output shaft, to flow movement between the at least one block and an adjacent block and to structurally connect the at least one block to the adjacent block, wherein interconnection of the plurality of blocks forms a construction.

In accordance with another aspect of the present invention, there is provided a construction kit comprising: a plurality of blocks, wherein at least one block of the plurality of blocks is a case for a servo having an output shaft, the case comprising an enclosure for enclosing at a least a portion of the servo, the servo for causing the case to perform a unique and a specific behavior; and a functional member configured to directly or indirectly functionally engage the output shaft and to facilitate the flow of movement between the case and an adjacent block and for structurally connecting the case to the adjacent block, wherein interconnection of the plurality of blocks form a construction.

In accordance with another aspect of the present invention, there is provided a case for a servo having an output shaft, the case configured as a building module comprising a plurality of sides that form an interior volume or enclosure for enclosing at least a portion of the servo, at least a portion of at least one side of the plurality of sides forming a functional face for directly or indirectly functionally engaging the output shaft.

In an embodiment of the present invention, when the interior volume or enclosure encloses at least a portion of the servo, the at least one functional face is directly or indirectly functionally engaged with the output shaft, and the servo is actuated to move the shaft, the at least one functional face moves with the shaft.

In accordance with another aspect of the present invention, there is provided a case for a servo having an output shaft, the case configured as a building module comprising an enclosure for enclosing at least a portion of a servo within, the enclosure defining a plurality of corners; and at least one projecting contact surface located proximate to at least one of the plurality of enclosure corners, the at least one projecting contact surface configured for directly or indirectly functionally engaging the output shaft.

In an embodiment of the present invention, when the enclosure encloses at least a portion of the servo, the at least one projecting contact surface is directly or indirectly functionally engaged with the output shaft, and the servo is actuated to move the shaft, the at least one projecting contact surface moves with the shaft.

In accordance with another aspect of the present invention, there is provided a case for a servo having an output shaft, the case configured as a building module, the building module comprising an enclosure for enclosing at least a portion of the servo and a moveable member comprising a boss for directly or indirectly functionally engaging the output shaft, the moveable member configured to move following the output shaft.

In an embodiment of the present invention, the moveable member further comprises a contact surface configured to contact at least one other building module.

In an embodiment of the present invention, when at least a portion of a servo having an output shaft is enclosed by the enclosure, the at least one moveable member is directly or indirectly functionally engaged with the output shaft, and the servo is actuated to move the output shaft, the output shaft moves the moveable member.

In an embodiment of the present invention, when at least a portion of a servo having an output shaft is enclosed by the enclosure, the at least one moveable member is directly or indirectly functionally engaged with the output shaft, the contact surface of the at least one moveable member is engaged with at least a portion of one other building module, and the servo is actuated to move the output shaft, the at least one moveable member moves with the output shaft which in turn moves the at least one other building module.

In an embodiment of the present invention, the at least one moveable member is configured to rotate following rotation of the output shaft.

In an embodiment of the present invention, the at least one moveable member is a disc.

In an embodiment of the present invention, the building module is a passive building module.

In an embodiment of the present invention, the building module is an active building module comprising the servo wherein at least a portion of the servo is enclosed by the enclosure.

In an embodiment of the present invention, the at least one other building module is configured to operably engage with the contact surface of the at least one moveable member.

In an embodiment of the present invention, the at least one other building module is an active building module comprising a servo and is configured to operably engage with the contact surface of the at least one moveable member.

In an embodiment of the present invention, the at least one other building module is a passive building module and is configured to operably engage with the contact surface of the at least one moveable member.

In an embodiment, the building module is for use in a construction kit with other building modules.

In an embodiment, the construction kit is an educational or toy construction kit.

In an embodiment, the education or toy construction kit is a robot construction kit.

In accordance with another aspect of the present invention, there is provided a case for a servo having an output shaft, the case configured as a module for enclosing at least a portion of the servo, the module comprising at least one rotating disc configured to directly or indirectly functionally engage the output shaft, the at least one rotating disc configured to rotate following the output shaft.

In an embodiment of the present invention, the at least one rotating disc comprises a boss for directly or indirectly functionally engaging the output shaft.

In an embodiment of the present invention, the at least one rotating disc has at least one face for connecting the module to a second module and facilitating movement of the second module.

In an embodiment of the present invention, the module comprises a second rotating disc provided facing the first rotating disc to rotate relatively to the first rotating disc in a plane parallel to the first rotating disc.

In accordance with another aspect of the present invention, there is provided a construction comprising: a case for a servo having an output shaft, the case configured as a first module for enclosing at least a portion of the servo, the first module comprising a rotating disc configured to directly or indirectly functionally engage the output shaft and to rotate following the output shaft, and a second module having at least one face, the second module connected to the first module wherein the at least one face is connected to the rotating disc.

In an embodiment of the present invention, when at least a portion of the servo is enclosed by the first module, the rotating disc is directly or indirectly functionally engaged with the output shaft and the servo actuated to rotate the output shaft, the rotating disc rotates following the output shaft and the second module rotates following the rotating disc.

In an embodiment of the present invention, the rotating disc comprises a boss for directly or indirectly functionally engaging the output shaft.

In an embodiment of the present invention, the first module comprises a second rotating disc provided facing the first rotating disc to rotate relatively to the first rotating disc in a plane parallel to the first rotating disc.

In accordance with another aspect of the present invention, there is provided a construction comprising: a case for a servo having an output shaft, the case configured as a first module comprising an enclosure for enclosing at least a portion of the servo; a rotating disc for directly or indirectly functionally engaging the output shaft, the rotating disc comprising a boss for fitting the output shaft, the rotating disc to rotate following the output shaft; a second module connected to the first module, the second module comprising a face facing the first rotating disc to rotate relatively to the rotating disc in a plane parallel to the first rotating disc according to the rotation of the output shaft.

In accordance with an aspect of the present invention, there is provided a case for a servo having an output shaft, the case configured as a functional building module adapted to perform a specific function, the functional building module comprising: an enclosure for enclosing at least a portion of the servo, the enclosure defining a plurality of corners, and at least one functional member adapted to directly or indirectly functionally engage with the output shaft, the at least one functional member comprising a contact surface located proximate at least one of the plurality of enclosure corners.

In an embodiment of the present invention, the contact surface of the at least one functional member is adapted to engage with at least one other building module.

In an embodiment of the present invention, when at least a portion of the servo is enclosed by the enclosure, the at least one functional member is directly or indirectly functionally engaged with the output shaft, and when the servo is actuated to move the output shaft, the output shaft provides movement to the functional member.

In an embodiment of the present invention, when at least a portion of the servo is enclosed by the enclosure, the at least one functional member is directly or indirectly functionally engaged with the output shaft, the contact surface of the at least one functional member is engaged with at least one other building module and the servo is actuated to move the output shaft, the output shaft provides movement to the functional member, the functional member provides movement to the at least one other building module.

In an embodiment of the present invention, the movement is rotation.

In an embodiment of the present invention, the functional building module further comprises a servo having an output shaft at least partially enclosed by the enclosure.

In an embodiment of the present invention, the at least one other building module is configured to operably engage with the contact surface of the at least one functional member.

In an embodiment of the present invention, the at least one other building module is a functional building module configured to operably engage with the contact surface of the at least one functional member.

In an embodiment of the present invention, the at least one other building module is a passive building module configured to operably engage with the contact surface of the at least one functional member.

In an embodiment, the functional building module is for use in a construction kit with other building modules.

In an embodiment, the construction kit is an educational or toy construction kit.

In accordance with another aspect of the present invention, there is provided a construction kit comprising a plurality of building modules, wherein at least one of the building modules is a case for a servo having an output shaft, the case configured as a functional building module adapted to perform a specific behaviour, the functional building module comprising: an enclosure for enclosing at least a portion of the servo, the enclosure defining a plurality of corners, and at least one functional member adapted to directly or indirectly functionally engage with the output shaft, the at least one functional member comprising a contact surface located proximate at least one of the plurality of enclosure corners, the contact surface of the at least one functional building module is configured to operably couple with at least one other building module, wherein the interconnection of the least one functional module and the least one other building module forms a construction.

In an embodiment of the present invention, when at least a portion of the servo is enclosed by the enclosure, the at least one functional member is directly or indirectly functionally engaged with the output shaft, and the servo actuated to move the output shaft, the output shaft provides movement to the functional member.

In an embodiment of the present invention, when at least a portion of the servo is enclosed by the enclosure, the at least one functional member is directly or indirectly functionally engaged with the output shaft, the contact surface of the at least one functional member is operably engaged with at least one other building module to form a construction and the servo is actuated to move the output shaft, the output shaft provides movement to the functional member which in turn provides movement to the at least one other building module.

In an embodiment of the present invention, the movement is rotation.

In an embodiment of the present invention, the functional building module further comprises a servo having an output shaft at least partially enclosed by the enclosure.

In an embodiment of the present invention, the at least one other building module is configured to operably engage with the contact surface of the at least one functional member.

In an embodiment of the present invention, the at least one other building module is a functional building module configured to operably engage with the contact surface of the at least one functional member.

In an embodiment of the present invention, the at least one other building module is a passive building module configured to operably engage with the contact surface of the at least one functional member.

In accordance with another aspect of the present invention, there is provided a construction kit comprising: a plurality of building modules, each of the building modules comprising at least one connection face adapted to pass movement from a first face of a first building module to a first face of a second building module; wherein each connection face of the building modules is connected with each of the other faces; wherein at least one of the building modules is a case for a servo having an output shaft, the case configured as a functional building module and adapted to perform a specific behaviour, the functional building module comprising: an enclosure for enclosing at least a portion of the servo, and at least one functional member adapted to directly or indirectly functionally engage with the output shaft, the at least one functional member comprising a contact surface configured to operably couple the at least one functional module to at least one other module, the contact surface enabling movement to pass from the at least one functional module, wherein the interconnection of the least one functional module and the least one other module forms a construction.

In an embodiment of the present invention, when at least a portion of a servo is enclosed by the enclosure, the at least one functional member is directly or indirectly functionally engaged with the output shaft, and the servo actuated to move the output shaft, the output shaft provides movement to the at least one functional member.

In an embodiment of the present invention, when at least a portion of a servo is enclosed by the enclosure, the at least one functional member is directly or indirectly functionally engaged with the output shaft, the contact surface of the at least one functional member is operably engaged with at least one other building module to form a construction and the servo is actuated to move the output shaft, the output shaft provides movement to the at least one functional member which in turn provides movement to the at least one other building module.

In an embodiment of the present invention, the movement is rotation.

In an embodiment of the present invention, the functional building module further comprises a servo having an output shaft, the servo at least partially enclosed by the enclosure.

In an embodiment of the present invention, the at least one other building module is configured to operably engage with the contact surface of the at least one functional member.

In an embodiment of the present invention, the at least one other building module is a functional building module configured to operably engage with the contact surface of the at least one functional member.

In an embodiment of the present invention, the at least one other building module is a passive building module configured to operably engage with the contact surface of the at least one functional member.

In accordance with another aspect of the present invention, there is a case for a servo having an output shaft, the case configured as a functional modular unit adapted to perform a specific function, the functional modular unit comprising: a plurality of sides that form an interior volume for enclosing at least a portion of the servo, wherein each side of the plurality of sides includes an inner surface and an outer surface; and an adjacent module connector disposed within the interior volume, the adjacent module connector configured to directly or indirectly functionally engage with the output shaft, wherein a portion of the module connector extends through the at least one side of the plurality of sides and beyond the outer surface thereof, and operably connects the modular unit with an adjacent modular unit when the adjacent module connector is operably connected to an adjacent face of the adjacent module.

In an embodiment of the present invention, the plurality of sides of the functional modular unit are configured in two interconnecting halves capable of interconnectivity.

In an embodiment of the present invention, the functional modular unit is an educational construction modular unit.

In accordance with another aspect of the present invention, there is provided an educational construction kit comprising: a plurality of blocks, wherein at least one block of the plurality of blocks is a case for a servo having an output shaft, the case configured as a functional block adapted to perform a specific function, the functional block comprising: a plurality of sides that form an interior volume for enclosing at least a portion of the servo, wherein each side of the plurality of sides includes an inner surface and an outer surface; and an adjacent block connector for movement exchange between an adjacent block, and for structurally connecting the at least one block to the adjacent block, the adjacent block connector disposed within the interior volume, the adjacent block connector adapted to directly or indirectly functionally engage with the output shaft, wherein a portion of the block connector extends through the at least one side of the plurality of sides and beyond the outer surface thereof, and operably connects the functional block with an adjacent block when the adjacent block connector is operably connected to an adjacent face of the adjacent block, wherein interconnection of the plurality of blocks form a construction.

In accordance with another aspect of the present invention, there is provided a building block system, comprising: connectable modules, at least one module is a case for a servo having an output shaft, the case configured as a movement module for enclosing at least a portion of the servo, at least one mechanical component that is required for movement is arranged in the movement module wherein the at least one mechanical component is configured to directly or indirectly functionally engage with the output shaft, wherein the modules are random connectable with one another to facilitate movement between adjacent modules, and wherein at least the at least one movement module is configured independently from the other modules.

In an embodiment of the present invention, the modules are connectable via their respective flat lateral surfaces.

In an embodiment of the present invention, the at least one movement module comprises a servo having an output shaft, wherein the at least one mechanical component is moved when the servo is actuated.

In an embodiment of the present invention, the at least one mechanical component is a rotatable cylindrical component.

In an embodiment of the present invention, the at least one mechanical component is two rotatable cylindrical components.

In an embodiment of the present invention, building blocks are attachable to the movement module, wherein the building blocks define movement parameters.

In an embodiment of the present invention, the movement parameters are variable directly at the at least one movement module.

In an embodiment of the present invention, passive modules are attached to the movement module.

In an embodiment of the present invention, at least one connection module is provided which is configured passive.

In accordance with another aspect of the present invention, there is provided a case for a servo having an output shaft, the case configured as a functional building module comprising: an enclosure for enclosing at least a portion of the servo, the enclosure defining a plurality of corners, and at least one rotatable member comprising a contact surface located proximate at least one of the plurality of enclosure corners, the at least one rotatable member configured for direct or indirect functional connection with the output shaft and to pass movement from the at least one functional building module to another building module, wherein each of the building modules comprises at least one face adapted to pass movement from a first face of the at least one functional building module to a first face of a second building module.

In an embodiment of the present invention, each connection face of the building modules is connected with each of the other faces.

In an embodiment of the present invention, the at least one rotatable member is configured to operably couple the functional module to at least one other module while providing at least one degree of freedom between the functional module and the at least one other module.

In accordance with an aspect of the present invention, there is provided a case for a servo having an output shaft, the case configured to substantially surround or enclose at least a portion of the servo, the case comprising or configured to provide at least two connector points for connection of at least two respective links of a linkage, the at least two connector points being arranged on the case such that the two connector points define at least two respective axes of rotation, the two axes of rotation being arranged to be non-collinear to each other.

In an embodiment of the present invention, when at least a portion of a servo is surrounded or enclosed by the case, the case is arranged or configured such that at least one of the at least two connector points is provided by the output shaft of the servo.

In an embodiment of the present invention, at least one of the at least two connector points provides for a movable connection, such as pivotal or rotatable connection, of a link of a linkage to the case.

In an embodiment of the present invention, one or more of the linkage connector points comprise one or fixing elements for retaining and/or fixing a link of a linkage to the case.

In an embodiment of the present invention, the case is configured to fix or be affixed to at least a portion of a servo by a friction fit and/or by one or more mechanical fixings.

In an embodiment of the present invention, the case comprises at least two other connector points, the at least two other connector points being arranged on the case such that the two other connector points define at least two other respective axes of rotation, the at least two other axes of rotation being arranged to be collinear to each other.

In accordance with another aspect of the present invention, there is provided an appendage comprising one or more cases as described above.

In accordance with another aspect of the present invention, there is provided a case for a servo having an output shaft, the case comprising one or more connector points for connection of linkages, such as upper linkages and/or lower linkages, the one or more connector points configured to movably connect, such as pivotably or rotatably connect, the link(s) of the upper linkages and the lower linkages.

In an embodiment of the present invention, when at least a portion of the servo is seated or positioned in the case, the case may be configured such that at least one of the one or more connector points may be provided by the output shaft of the servo via a front rotating disc. By configuring the case so that at least one of the one or more connector points is provided by the output shaft of the servo, via the front rotating disc, the links of the upper and/or lower linkages connected to the front rotating discs of the case may be driven by the servo. At least one other of the one or more connector points may be provided directly by the case, via, for example, a rear rotating disc or any of the front face, rear face, top face, bottom face, right-hand side face or left-hand side face of the case.

In an embodiment of the present invention, the case for the servo may comprise at least two connector points. The at least two connector points may be arranged on the case such that the at least two connector points define at least two respective axes of rotation. In some embodiments, the at least two axes of rotation may be arranged to be collinear to each other. In other embodiments, the at least two axes of rotation may be arranged to be non-collinear to each other. In other words, the two axes of rotation may be arranged on the case to be spaced, offset and/or extend parallel to each other.

In an embodiment of the present invention, the case may comprise at least two other connector points. The at least two other connector points may be arranged on the case such that the two other connector points define at least two other respective axes of rotation. The at least two other axes of rotation may be arranged to be in line to each other or collinear to each other. By providing at least two other connector points, additional links of the upper linkage and/or the lower linkage and may be connectable to the case. This may improve or strengthen the rigidity of the upper linkage and/or the lower linkage.

In an embodiment of the present invention, the servo (or parts thereof) may be arranged, or is arrangeable, in the case so as to provide at least one of the two and the two other connector points via the output shaft and front rotating disc. The at least two connector points and/or the at least two other connector points may be, or may comprise, connector points for additional components that provide a linkage between two or more cases.

In an embodiment of the present invention, the one or more cases, comprising servos, may form links in linkages between cases, such as, for example, the upper linkage and/or the lower linkage in, for example, an appendage, such as an arm or leg of a robot or walking machine. At least a portion, or all, of at least one case, in accordance with embodiments of the present invention, may be part of, or comprised in, a linkage, for example, the upper linkage. At least a portion, or all, of at least another case, in accordance with embodiments of the present invention, may be part of, or comprised in, another linkage, for example, the lower linkage. The/each of the one or more connector points of a case may comprise a surface for movable connection, e.g., pivotal or rotatable connection, of a link of, for example, the upper linkage and/or the lower linkage to the case. The/each of the one or more connector points may comprise one or more bearings and/or bushings for movable connection, e.g., pivotal or rotatable connection, of a link of the upper and/or lower linkages. The/each of the one or more connector points may comprise one or more lips, ridges, grooves or fixing elements for retaining and/or fixing a link of an upper linkage and/or a lower linkage to the case.

In embodiments of the present invention, each of the connector points may comprise a pair of parallel sublinkage connector points. This may allow for the attachment of additional linkage parts which may operate in parallel to strengthen or improve the rigidity of an upper linkage and/or the lower linkage. Each pair of parallel sublinkage connector points may have collinear rotational axes. For example, the one or more cases, comprising servos, may comprise linkage connector points which comprise two pairs of parallel sublinkage connector points, providing four connector points. One pair of connector points may be provided on the case for connection of two respective links, e.g., of an/the upper linkage and/or the lower linkage, and the second pair of connector points may be provided on the case for connection of two other respective links, e.g., of the upper linkage and/or lower linkage, e.g., of a leg for a legged robot or walking machine, which may be collinear with the rotational axis provided by an in-situ servo.

In accordance with another aspect of the present invention, there is provided a leg for a legged robot or walking machine comprising a plurality of cases for servos, in accordance with aspects of the present invention.

In an embodiment of the present invention, the leg may comprise one or more fixing points for fixing the leg to an external body, e.g., an external body of a legged robot or walking machine.

In an embodiment of the present invention, the leg may comprise a hip joint, a knee joint, an ankle joint and a foot, each joint being provided by a case for a servo in accordance with an aspect of the present invention. The leg may comprise an upper link which may be arranged or configured to connect the knee joint to the hip joint. The hip joint may provide the one or more fixing points for fixing the leg to an external body and may be arranged or configured to provide motion of the upper link relative to the one or more fixing points and to provide motion of the upper link about one or more axes of the hip joint. The leg may also comprise a lower link which may be arranged or configured to connect the knee joint to the ankle joint and/or foot of the leg, to provide motion of the lower link relative to the upper link and to provide motion of the lower link about one or more axes of the knee joint.

In an embodiment of the present invention, the knee joint may be connected or attached to a proximal end of the lower link. The ankle may be connected or attached to a distal end of the lower link. The foot may be attached or connected to the ankle. The foot may be attached or connected to the ankle by a connection arrangement. The connection arrangement may keep the foot fixed or stationary relative to the ankle. The connection arrangement may comprise at least one of a compliant joint and a spherical or universal joint.

In an embodiment of the present invention, the knee joint may be arranged or configured to provide motion around an axis orthogonal or substantially orthogonal to one or more of the hip joint axes. For example, when the knee joint is connected to the hip joint, e.g. by the upper link, at least one axis of the knee joint may be arranged to be substantially orthogonal to at least one axis of the hip joint. The leg may comprise three or fewer actuated (i.e., non-passive) degrees of freedom. The knee joint may be arranged to be substantially equidistant from the hip joint and from the foot and/or the ankle of the leg. The length of the upper link may be substantially equal to the length of the lower link. The length of the upper link may be substantially longer than the length of the lower link.

In an embodiment of the present invention, the hip joint may be configured or arranged to provide rotation of the upper link in the sagittal plane, e.g., flexion/extension, about the/a axis of the hip joint, which may be arranged to be substantially perpendicular to a central or longitudinal axis of the leg or substantially perpendicular to the sagittal plane.

In an embodiment of the present invention, the hip joint may be configured or arranged to provide rotation of the upper link in the coronal plane, e.g., adduction/abduction about the/a axis of the hip joint, which may be arranged to extend in a nominal anteroposterior direction of the hip joint or be substantially perpendicular to the coronal plane.

In an embodiment of the present invention, the knee joint may be configured or arranged to provide motion of the lower link in the coronal plane. The knee joint may not provide motion in the sagittal plane.

In an embodiment of the present invention, the knee joint may be configured or arranged to provide motion of the upper link in the sagittal plane.

In an embodiment of the present invention, the hip joint may be arranged or configured to provide motion of the upper link in the sagittal plane (e.g., flexion/extension) and the knee joint may be configured provide motion of the lower link in the coronal plane (e.g., abduction/adduction). Alternatively, the hip joint may be arranged or configured to provide motion of the upper link in the coronal plane and the knee joint may be arranged or configured to provide motion of the lower link in the sagittal plane.

In an embodiment of the present invention, the knee joint and/or hip joint may be configured or arranged to provide motion of the upper and/or lower links in a transverse plane of the leg and/or about the/a nominally vertical or longitudinal axis of the leg (e.g., internal/external rotation). For example, the hip joint may be configured or arranged to provide motion of the upper link in the sagittal plane and the knee joint may be configured or arranged to provide motion of the lower link in the coronal and/or transverse planes.

In an embodiment of the present invention, the upper linkage may be configured or arranged to maintain the knee joint and the hip joint substantially parallel to each other during movement of the leg, e.g., in use. The upper link may be part of or be comprised in the upper linkage. The upper linkage may comprise a plurality of upper links. The upper links of the upper linkage may be arranged to be substantially parallel to each other. The upper linkage may be or comprise at least one of a two-bar linkage, a four-bar linkage, or other parallel or multiple bar linkage.

In an embodiment of the present invention, the lower linkage may be configured or arranged to maintain the knee joint, the foot and/or ankle substantially parallel to each other during movement of the leg, e.g., in use. The lower link may be part of or be comprised in the lower linkage. The lower linkage may comprise a plurality of lower links. The lower links of the lower linkage may be arranged to be substantially parallel to each other. The lower linkage may be or comprise at least one of a two-bar linkage, a four-bar linkage, or other parallel or multiple bar linkage.

In an embodiment of the present invention, the upper and lower linkages may be configured or arranged to maintain the hip joint and ankle and/or foot substantially parallel to each other during movement of the leg, e.g. in use. For example, the knee joint may be connected to the hip joint by at least part or all of the upper linkage, the hip joint may be configured or arranged to provide motion of at least part or all of the upper linkage primarily in the sagittal plane and/or the knee joint may be connected to the ankle, which may be fixed or connected to the knee joint by at least part or all of the lower linkage, the knee joint may be configured or arranged to provide motion of the ankle, foot and/or at least part or all of lower linkage primarily in the coronal and/or transverse plane. This may provide motion of the leg in two or more dimensions and/or maintain the foot substantially parallel to the hip by using, e.g., two cases comprising servos for the situation of the knee joint being configured or arranged to provide motion of the ankle, foot and/or at least part or all of lower linkage primarily in the coronal plane and/or three cases comprising servos for the situation of the knee joint being configured or arranged to provide motion of the ankle, foot and/or at least part or all of lower linkage primarily in the coronal and transverse planes.

In an embodiment of the present invention, the hip joint may be configured to provide motion of the upper link and/or at least part or all of the upper linkage primarily in the sagittal and/or transverse planes, the knee joint may be configured to provide motion primarily of the lower link, at least part or all of lower linkage, ankle and/or foot in the coronal plane.

In an embodiment of the present invention, the hip joint may be configured to provide motion of the upper link and/or at least part or all of upper linkage primarily in the coronal and/or transverse planes, the knee joint may be configured to provide motion of the lower link, at least part or all of the lower linkage, the ankle and/or foot primarily in the sagittal plane.

In an embodiment, the leg may comprise one, two or more cases comprising servos. The one, two or more cases comprising servos may be arranged in or on the leg such that the one, two or more cases comprising servos provide the three or fewer actuated degrees of freedom of the leg.

In an embodiment of the present invention, at least one of the cases comprising a servo may be arranged or configured to operate and/or cause motion of the hip joint, knee joint and/or ankle joints. For example, each of the cases making up the hip joint, knee joint and/or ankle may be arranged or configured to substantially surround or enclose at least a portion of a respective servo, for example a standard RC servo.

In accordance with an aspect of the present invention, there is provided a case for enclosing at least a portion of a servo having an output shaft, the case configured as a block comprising a first rotating disc comprising a boss configured to functionally fit the output shaft therein, the first rotating disc rotating following the output shaft when at least a portion of the servo is enclosed by the block, the output shaft is fit in the boss and the servo actuated, and a second rotating disc provided facing the first rotating disc to rotate relatively to the first rotating disc in a plane parallel to the first rotating disc.

In accordance with an aspect of the present invention, there is provided a robot toy comprising: a case for enclosing at least a portion of a servo having an output shaft, the case configured as a first block comprising a first rotating disc having a boss configured to functionally fit the output shaft therein, the first rotating disc rotating following the output shaft when at least a portion of the servo is enclosed by the block, the output shaft is fit in the boss and the servo actuated, and a second rotating disc provided facing the first rotating disc to rotate relatively to the first rotating disc in a plane parallel to the first rotating disc, and a second block connected to the first block.

In an embodiment of the present invention, the first rotating disc protrudes outward from the case.

In an embodiment of the present invention, the second rotating disc protrudes outward from the case.

In an embodiment of the present invention, the second block is connected to the first block via a linkage.

In an embodiment of the present invention, the second block is connected to the first block via the first rotating disc.

In an embodiment of the present invention, the second block is connected to the first block via the second rotating disc.

In an embodiment of the present invention, the second rotating disc rotates relatively to the first rotating disc.

In accordance with another aspect of the present invention, there is provided a robot toy comprising: a case enclosing at least a portion of a servo having an output shaft, the case configured as a first block comprising a first rotating disc comprising a boss fitting the output shaft therein, the first rotating disc to rotate following the output shaft; and a second rotating disc provided facing the first rotating disc to rotate relatively to the first rotating disc in a plane parallel to the first rotating disc.

In an embodiment of the present invention, the first rotating disc protrudes outward from the case.

In an embodiment of the present invention, the second rotating disc protrudes outward from the case.

In accordance with another aspect of the present invention, there is provided a robot toy comprising: a case enclosing at least a portion of a servo having an output shaft, the case configured as a first block, the first block comprising a first rotating disc comprising a boss for fitting the output shaft of the servo, the first rotating disc to rotate following the output shaft and a second rotating disc provided facing the first rotating disc to rotate relatively to the first rotating disc in a plane parallel to the first rotating disc; and a second block connected to the first block by a linkage.

In an embodiment of the present invention, the second block is moveable relative to the first block via the linkage.

In accordance with another aspect of the present invention, there is provided a case for a servo having an output shaft, the case comprising an interior volume for enclosing at least a portion of the servo; a first disc and a second disc, the interior volume positioned between the first and second discs, the first disc to rotate with the output shaft of the servo and the second disc facing the first rotating disc to rotate relative to the first rotating disc.

In accordance with another aspect of the present invention, there is provided a robot toy comprising a first case comprising an interior volume for enclosing at least a portion of a servo having an output shaft, a first disc and a second disc, the output shaft of the servo positioned between the first and second discs, the first disc to rotate with the output shaft of the servo, the second disc facing the first rotating disc to rotate relative to the first rotating disc and a second case, the second case movable relative to the first case via connection of the first rotating disc with an adjacent surface of the second case.

In accordance with another aspect of the present invention, there is provided a case for a servo having an output shaft, the case comprising: a servo portion that is configured to receive at least a portion of the housing of the servo; a shaft portion that is configured to directly or indirectly functionally engage the output shaft of the servo; and a bearing portion that supports the shaft portion for movement therein.

In an embodiment of the present invention, the shaft portion is configured to directly functionally engage the output shaft or indirectly functionally engage the output shaft via an arm, a horn or a gear.

In an embodiment of the present invention, the bearing portion comprises an aperture, the aperture configured to receive the shaft portion, the shaft portion rotatable in the aperture.

In an embodiment of the present invention, the aperture is a central aperture.

In an embodiment of the present invention, the aperture has an inner surface, the inner surface supporting the shaft portion for rotation in the aperture along the inner surface.

In an embodiment of the present invention, the shaft portion is rotatable relative to a main body of the bearing portion.

In an embodiment of the present invention, the shaft portion comprises a cylindrical main body portion, one end of the main body portion including an aperture that is configured to directly or indirectly receive and to directly or indirectly functionally engage the rotatable output shaft of the servo, a second end of the main body portion including a flange portion that extends outward from the cylindrical main body portion, the flange portion being at least approximately cylindrical and having an outer surface being at least approximately flat, the outer surface being configured to attach the shaft portion to other components.

In accordance with another aspect of the present invention, there is provided a case for a servo having a rotatable output shaft, the case comprising: a servo portion configured to enclose at least a portion of the servo; a bearing portion that is substantially collinear with the servo portion, the bearing portion comprising a central aperture; and a shaft portion that is configured to directly or indirectly functionally engage the rotatable shaft of the servo, wherein at least a portion of the shaft portion fits through the central aperture in the bearing portion.

In an embodiment of the present invention, the case further comprises a servo having a rotatable output shaft, wherein at least a portion of the servo is enclosed by the servo portion and wherein the shaft portion directly or indirectly functionally engages the shaft.

In an embodiment of the present invention, the shaft portion is rotatable relative to the stationary bearing portion.

In an embodiment of the present invention, the shaft portion comprises a first end that is configured to directly or indirectly functionally engage the output shaft of the servo, and a second end that is configured to connect the case to another component.

In accordance with an aspect of the present invention, there is provided a case for a servo having an output shaft, the case comprising: a first portion that is configured to enclose at least a portion of the servo; a rotatable member that is configured to be directly or indirectly functionally engaged with the output shaft; and a second portion that is configured to be attached to the first portion and that has an aperture that is configured to receive and support the rotatable member.

In an embodiment of the present invention, the first portion and the second portion are at least approximately collinear.

In an embodiment of the present invention, the rotatable member is at least approximately perpendicular to the first and the second portions.

In an embodiment of the present invention, the rotatable member increases a load bearing capacity of the servo.

In accordance with an aspect of the present invention, there is provided a case for a servo, the case comprising: a servo portion that is configured to receive at least a portion of the servo; a shaft portion that is configured to directly or indirectly functionally engage an output shaft of the servo, a track portion having a track formed therein, wherein the track portion is configured to support the shaft portion, wherein the shaft portion is configured to be rotated in the track of the track portion.

In an embodiment of the present invention, the servo portion is configured to substantially surround the servo.

In an embodiment of the present invention, the servo portion and the track portion are formed as one integrated component.

In an embodiment of the present invention, the servo portion and the track portion are formed as separate components.

In an embodiment of the present invention, the servo portion has an approximately rectangular shape that includes an inner perimeter that is larger than an outer perimeter of the servo.

In an embodiment of the present invention, the track portion comprises a central aperture having an inner surface that is configured to receive the shaft portion, wherein the shaft portion is rotatable within the central aperture supported by the inner surface relative to the track of the track portion.

In accordance with an aspect of the present invention, there is provided a case for a servo, the case comprising: a servo receiving portion; a track portion that is connected, and at least approximately axially aligned, with the servo receiving portion; and a shaft portion that is configured to directly or indirectly functionally engage a rotatable shaft of the servo, and to fit through a central aperture in the track portion.

In an embodiment of the present invention, the case further comprises a servo that fits through a central aperture in the servo portion, and that has an output shaft.

In an embodiment of the present invention, the track portion includes a track that is configured to support the shaft portion, wherein the shaft portion is configured to be rotated in the track of the track portion, and wherein the shaft portion is functionally connected to the servo and rotatable within the track relative to the stationary track portion.

In an embodiment of the present invention, the shaft portion includes a first end that is configured to directly or indirectly functionally engage an output shaft of the servo, and a second end that is configured to connect the case to another component.

In accordance with an aspect of the present invention, there is provided a case for a servo having an output shaft, the case comprising: a first portion that is configured to enclose at a least a portion of the servo; a rotatable member that is configured to be directly or indirectly functionally engaged to the output shaft of the servo; and a second portion is at least approximately axially aligned with the first portion, the second portion configured to receive and support the rotatable member for rotation therein.

In an embodiment of the present invention, the rotatable member is at least approximately perpendicular to the first and the second portions.

In accordance with an aspect of the present invention, there is provided a case for a servo, the case comprising: a servo portion that is configured to receive the servo; a rotatable member; and a bushing portion that is configured to support the rotatable member; wherein the bushing portion comprises a central aperture that is configured to receive the rotatable member, wherein the rotatable member is rotatable within the inner surface of the central aperture relative to the bushing portion.

In an embodiment of the present invention, the rotatable member is configured to directly or indirectly functionally engage an output shaft of the servo, and is configured to be rotated in an aperture of the bushing portion.

In an embodiment of the present invention, the servo portion and the busing portion are formed as one integrated component.

In an embodiment of the present invention, the servo portion and the bushing portion are formed as separate components.

In an embodiment of the present invention, the servo portion has an approximately rectangular shape that includes an inner perimeter that is larger than an outer perimeter of the servo.

In accordance with an aspect of the present invention, there is provided a case for a servo, the case comprising: a servo portion that is configured to receive at least a portion of a servo; a bushing portion that is configured to support a rotatable member, wherein the bushing portion comprises a central aperture.

In an embodiment of the present invention, the case further comprises a rotatable member that is configured to directly or indirectly functionally engage an output shaft of the servo, and that is configured to be rotated in an aperture of the bushing portion.

In an embodiment of the present invention, the servo portion and the bushing portion are formed as one integrated component.

In an embodiment of the present invention, the servo portion and the bushing portion are formed as separate components.

In an embodiment of the present invention, the servo portion has an approximately rectangular shape that includes an inner perimeter that is larger than an outer perimeter of the servo.

In accordance with an aspect of the present invention, there is provided a case for a servo, the case comprising: a servo portion for enclosing at least a portion of a servo having a rotatable output shaft; and a shaft attachment mechanism having a shaft receiving portion for supporting a direct or indirect functional engagement of the shaft attachment mechanism to the rotatable output shaft, the functional engagement being such that rotation of the rotatable output shaft causes a corresponding rotation of the shaft attachment mechanism.

In an embodiment of the present invention, the rotatable output shaft is splined in that it includes a plurality of circumferentially distributed splines.

In an embodiment of the present invention, the splined rotatable output shaft includes a certain number of teeth, wherein the certain number of teeth is selected from a group consisting of 23, 24, and 25.

In an embodiment of the present invention, the shaft receiving portion is a spline receiving portion including a plurality of circumferentially distributed protrusions sized and dispersed so as to support a direct functional engagement of the shaft attachment mechanism to the rotatable output shaft.

In an embodiment of the present invention, the rotatable output shaft includes an arm, horn or gear including a plurality of circumferentially distributed protrusions sized and dispersed so as to support a direct functional engagement of the arm, horn or gear to the rotatable output shaft.

In an embodiment of the present invention, the shaft receiving portion is an arm, horn or gear receiving portion shaped and sized so as to support an indirect functional engagement of the shaft mechanism to the rotatable output shaft.

In embodiment of the present invention, the shaft attachment mechanism further comprises a top surface that is positioned substantially perpendicular to the rotatable output shaft when the shaft attachment mechanism is directly or indirectly functionally engaged to the rotatable output shaft.

In an embodiment of the present invention, the rotatable output shaft includes a top surface that is positioned within a plane that is substantially perpendicular relative to the axis of the shaft; and the shaft attachment mechanism includes a bottom receiving surface that, when the shaft attachment mechanism is directly or indirectly functionally engaged to the rotatable output shaft, is positioned proximate to the top surface of the rotatable output shaft within a plane that is substantially perpendicular relative to the axis of the shaft.

In an embodiment of the present invention, the bottom receiving surface flushly engages the top surface of the rotatable output shaft or the arm, horn or gear when the shaft attachment mechanism is functionally engaged to the rotatable output shaft.

In an embodiment of the present invention, the shaft attachment mechanism is a unitarily formed, single piece.

In an embodiment of the present invention, the case provides enhanced servo operational capacity.

In accordance with an aspect of the present invention, there is provided a case for a servo, the case comprising: a servo having a rotatable output shaft, a shaft attachment mechanism configured to directly or indirectly functionally engage the rotatable output shaft such that rotation of the rotatable output shaft causes a corresponding rotation of the shaft attachment mechanism, the shaft attachment mechanism including a top surface that, when the shaft attachment mechanism is functionally engaged to the rotatable output shaft, is positioned substantially perpendicular relative to the rotatable output shaft; and wherein the shaft attachment mechanism further comprises a bottom surface configured to flushly engage a portion of the rotatable output shaft or an arm, horn or gear, when the shaft attachment mechanism is functionally engaged to the rotatable output shaft.

In an embodiment of the present invention, the rotatable output shaft includes a certain number of teeth that support said functional engagement, wherein the certain number of teeth is selected from a group consisting of 23, 24, and 25.

In an embodiment of the present invention, the rotatable output shaft includes a top surface that is positioned within a plane that is substantially perpendicular relative to the common axis; and the shaft attachment mechanism includes a bottom receiving surface that, when the shaft attachment mechanism is directly or indirectly functionally engaged to the rotatable output shaft, is positioned proximate to the top surface of the rotatable output shaft within a plane that is substantially perpendicular relative to the common axis.

In an embodiment of the present invention, the top receiving surface flushly engages the top surface of the rotatable output shaft, arm, horn or gear, when the shaft attachment mechanism is functionally engaged to the rotatable output shaft.

In an embodiment of the present invention, the shaft attachment mechanism is a unitarily formed, single piece.

In an embodiment of the present invention, the case provides enhanced servo operational capacity.

In accordance with an aspect of the present invention, there is provided a case for a servo having a rotatable output shaft, the case comprising: a servo portion for enclosing at least a portion of the servo; a shaft attachment mechanism having a shaft receiving portion, the shaft receiving portion shaped and sized so as to support a direct or indirect functional engagement of the shaft attachment mechanism to the rotatable shaft, the functional engagement being such that rotation of the rotatable output shaft causes a corresponding rotation of the shaft attachment mechanism.

In an embodiment of the present invention, the output shaft is splined in that it includes a plurality of circumferentially distributed spines.

In an embodiment of the present invention, the shaft receiving portion is a spline receiving portion, the spline receiving portion including a plurality of circumferentially distributed protrusions sized and dispersed so as to support a functional engagement of the shaft attachment mechanism to the rotatable output shaft.

In an embodiment of the present invention, the output shaft comprises an arm, horn or gear, the arm, horn or gear including a plurality of circumferentially distributed protrusions sized and dispersed so as to support functional engagement of the arm, horn or gear to the rotatable output shaft.

In an embodiment of the present invention, the shaft receiving portion is an arm, horn or gear receiving portion, the arm, horn or gear receiving portion shaped and sized so as to support a functional engagement of the shaft attachment mechanism to the output shaft.

In an embodiment of the present invention, the shaft attachment mechanism further comprises a top surface that is positioned substantially perpendicular relative to the axis of the rotatable output shaft when the shaft attachment mechanism is functionally engaged to the rotatable output shaft.

In an embodiment of the present invention, the rotatable output shaft includes a top surface that is positioned within a plane that is substantially perpendicular relative to the axis of the output shaft.

In an embodiment of the present invention, the shaft attachment mechanism includes a bottom receiving surface that, when the shaft attachment mechanism is functionally engaged to the rotatable output shaft, is positioned proximate to the top surface of the rotatable output shaft within a plane that is substantially perpendicular relative to the axis of the output shaft.

In an embodiment of the present invention, the bottom receiving surface flushly engages the top surface of the rotatable output shaft or the arm, horn or gear, when the shaft attachment mechanism is functionally engaged to the rotatable output shaft.

In an embodiment of the present invention, the rotatable output shaft is splined and the rotatable output shaft includes a certain number of teeth, wherein the certain number of teeth is selected from a group consisting of 23, 24, and 25.

In an embodiment of the present invention, the shaft attachment mechanism is a unitarily formed, single piece.

In accordance with an aspect of the present invention, there is provided a case for a servo, the case comprising: a servo having a rotatable output shaft, a shaft attachment mechanism configured to directly or indirectly functionally engage the rotatable output shaft such that rotation of the rotatable output shaft causes a corresponding rotation of the shaft attachment mechanism, the shaft attachment mechanism including a top surface that, when the shaft attachment mechanism is functionally engaged to the rotatable output shaft, is positioned substantially perpendicular relative to the rotatable output shaft; wherein the rotatable output shaft includes a top surface that is positioned within a plane that is substantially perpendicular relative to the common axis; the shaft attachment mechanism includes a bottom receiving surface that, when the shaft attachment mechanism is functionally engaged to the rotatable output shaft, is positioned proximate to the top surface of the rotatable output shaft within a plane that is substantially perpendicular relative to the common axis; and wherein the bottom receiving surface flushly engages the top surface of the rotatable output shaft, arm, horn or gear, when the shaft attachment mechanism is functionally engaged to the rotatable output shaft.

In an embodiment of the present invention, the rotatable output shaft includes a certain number of teeth that support said functional engagement, wherein the certain number of teeth is selected from a group consisting of 23, 24, and 25.

In an embodiment of the present invention, the shaft attachment mechanism is a unitarily formed, single piece.

In an embodiment of the present invention, there is provided a case for enclosing at least a portion of a servo having a rotatable output shaft, the case comprising: a plurality of sides that form an interior volume or enclosure for containing or enclosing at least a portion of the servo, wherein each side of the plurality of sides comprises an outer face, a shaft attachment mechanism configured to directly or indirectly functionally engage the rotatable output shaft of the servo such that rotation of the rotatable output shaft causes a corresponding rotation of the shaft attachment mechanism, the shaft attachment mechanism comprising a top surface that, when the shaft attachment mechanism is directly or indirectly functionally engaged with the rotatable output shaft, is positioned along an axis substantially perpendicular relative to the rotatable output shaft, and a bottom receiving surface that, when the shaft attachment mechanism is directly or indirectly functionally engaged with the rotatable output shaft, is positioned proximate to and flushly engages a top surface of the rotatable output shaft, arm, gear or horn; and wherein the top surface of the shaft attachment mechanism provides an attachment surface for the attachment of additional components.

In an embodiment of the present invention, the rotatable output shaft of the servo is splined in that it includes a plurality of circumferentially distributed splines and the shaft attachment mechanism comprises a spline receiving portion comprising a plurality of circumferentially distributed protrusions sized and dispersed so as to support a functional engagement of the spline receiving portion to the splined rotatable output shaft of the servo, the functional engagement being such that rotation of the splined rotatable output shaft causes a corresponding rotation of the shaft attachment mechanism; the rotatable output shaft comprising a top surface that is positioned within a plane that is substantially perpendicular relative to the plurality of circumferentially distributed splines; the shaft attachment mechanism also comprising a bottom receiving surface that, when the spline receiving portion is functionally engaged to the splined rotatable output shaft, is positioned proximate to and flushly engages a top surface of the splined rotatable output shaft, the shaft attachment mechanism also comprising a top surface that is positioned within a plane that is substantially parallel relative to the bottom receiving surface; and wherein the top surface of the shaft attachment mechanism provides an attachment surface for the attachment of additional components.

In accordance with an aspect of the present invention, there is provided a case comprising: a servo having a rotatable output shaft; and a shaft attachment mechanism having a shaft receiving portion shaped and sized so as to support a functional engagement of the shaft attachment mechanism to the rotatable output shaft, the functional engagement being such that rotation of the rotatable output shaft causes a corresponding rotation of the shaft attachment mechanism.

In an embodiment of the present invention, the rotatable output shaft is splined in that it includes a plurality of circumferentially distributed splines.

In an embodiment of the present invention, the shaft receiving portion is a spline receiving portion, the spline receiving portion including a plurality of circumferentially distributed protrusions sized and dispersed so as to support a functional engagement of the shaft attachment mechanism to the rotatable output shaft, the functional engagement being such that rotation of the rotatable output shaft causes a corresponding rotation of the shaft attachment mechanism.

In an embodiment of the present invention, the rotatable shaft includes a top surface that is positioned within a plane that is substantially perpendicular relative to the plurality of circumferentially distributed splines.

In an embodiment of the present invention, the shaft attachment mechanism includes a bottom receiving surface that, when the shaft attachment mechanism is functionally engaged to the rotatable output shaft, is positioned proximate to the top surface of the rotatable output shaft within a plane that is substantially perpendicular relative to the plurality of circumferentially distributed splines and wherein the shaft attachment mechanism further includes a top surface that is positioned within a plane that is substantially parallel relative to the bottom surface.

In an embodiment of the present invention, the bottom receiving surface flushly engages the top surface of the rotatable output shaft when the shaft attachment mechanism is functionally engaged to the rotatable output shaft.

In an embodiment of the present invention, the top surface of the shaft attachment mechanism provides an attachment surface for the attachment of additional components.

In an embodiment of the present invention, the plurality of sides are configured in two interconnecting portions capable of interconnectivity.

A case for a servo in accordance with embodiments of the present invention may enclose at least a portion of the servo within a fixed structure that allows for easy access and removal of the servo. This may be achieved at least by the case having an internal cavity for accommodating at least a portion of the servo.

A case for a servo in accordance with embodiments of the present invention may fully enclose the entire servo.

A case for a servo in accordance with embodiments of the present invention may be cut, shaped, drilled, glued and/or mounted in almost any way provided the internal cavity of the case is not compromised.

A case for a servo in accordance with embodiments of the present invention may provide an outer surface that allows the servo to be easily mounted in any orientation.

A case for a servo in accordance with embodiments of the present invention may provide unlimited ways in which the case is mounted or attached to a surface and may also provide unlimited ways in which additional substrates or components are attached thereto.

A case for a servo in accordance with embodiments of the present invention may provide a surface for an unlimited number of hub patterns to allow endless attachment options.

A case for a servo in accordance with embodiments of the present invention may provide a connecting structure configured so that a connection between cases is facilitated for a plurality of different orientations of the cases relative to one another and as such, a user can easily provide different orientations without having to use different cases.

A case for a servo in accordance with embodiments of the present invention may be solid case enclosing the entire servo, wherein the user is able to reshape the case in any way they see fit and to connect/mount any number of cases together to allow for more creative and freeform results.

A case for a servo in accordance with embodiments of the present invention may be enclose only a portion of the servo keeping the case compact so that it can be used in even the thinnest applications.

A case for a servo in accordance with embodiments of the present invention may be relatively inexpensive to manufacture.

A case for a servo in accordance with embodiments of the present invention may be designed to allow for low cost production allowing it to be an affordable solution for those who find some cases and servo building kits too expensive.

A case for a servo in accordance with embodiments of the present invention may allow interfacing with common servos to be simpler and more attainable to users, including beginner users, average users and advanced users.

A case for a servo in accordance with embodiments of the present invention may be light yet have sufficient stiffness.

A case for a servo in accordance with embodiments of the present invention may increase the servo's load-bearing capabilities by helping to isolate the lateral load from the servo output shaft and housing.

A case for a servo in accordance with embodiments of the present invention may be extremely versatile and allow users to create complex, extremely rigid, structures with ease using a standard servo.

A case for a servo in accordance with embodiments of the present invention may provide a robust framework for the servo and may act to serve as a servo exoskeleton, potentially greatly enhancing the mechanical loads the servo can withstand.

A case for a servo in accordance with embodiments of the present invention may allow for a mechanically rather simple connection with other components, including other cases for servos in accordance with embodiments of the present invention, so it can be engaged to, and disengaged from, the other components in a simple manner and to facilitate quick changes of the orientation of the components relative to one another.

A case for a servo in accordance with embodiments of the present invention may be randomly connectable to other components, including other cases for servos in accordance with embodiments of the present invention, to allow the assembly and creation of all types of different models, including vehicles, creatures, animals, robots etc., to which users can associate particular movement- and behavioral patterns to bring them to life.

A case for a servo in accordance with embodiments of the present invention may provide a simple connection between it and other components, including active and passive components, thus facilitating movement between all connected components and thus facilitating a plurality of configured models and movement paths.

A case for a servo in accordance with embodiments of the present invention may provide the active component which generates movement, which, when connected to other components, may transfer the movement to the other components to control the movement of the other components.

A case for a servo in accordance with embodiments of the present invention may provide the first active component, which, when connected to another case for a servo in accordance with embodiments of the present invention, which provides a second active component, the first active component may transmit movement through connection with the second active component in assembled condition in order to provide a movement capable model without having to use passive components.

A case for a servo in accordance with embodiments of the present invention, when connected with other components, provides the ability of a user to change the position and arrangement of the components relative to one another.

Other objects, features and advantages of the embodiments of the present invention will become apparent from the following detailed description considered in connection with the accompanying drawings. It is to be understood however, that the drawings are designed as an illustration only and not as a definition of the limits of the present invention.

BRIEF DESCRIPTION OF THE DRAWINGS

In the drawings, wherein similar reference characters denote similar elements throughout the several views:

FIG. 7 shows a top view of the case of FIG. 2;

FIG. 8 shows a bottom view of the case of FIG. 2;

FIG. 9 shows a front view of the front rotating disc of the case of FIG. 2;

FIG. 10 shows a rear view of the front rotating disc of the case of FIG. 2;

FIG. 11 shows a front view of the rear rotating disc of the case of FIG. 2;

FIG. 12 shows a rear view of the rear rotating disc of the case of FIG. 2;

DETAILED DESCRIPTION OF PREFERRED EMBODIMENTS

Figure 1:
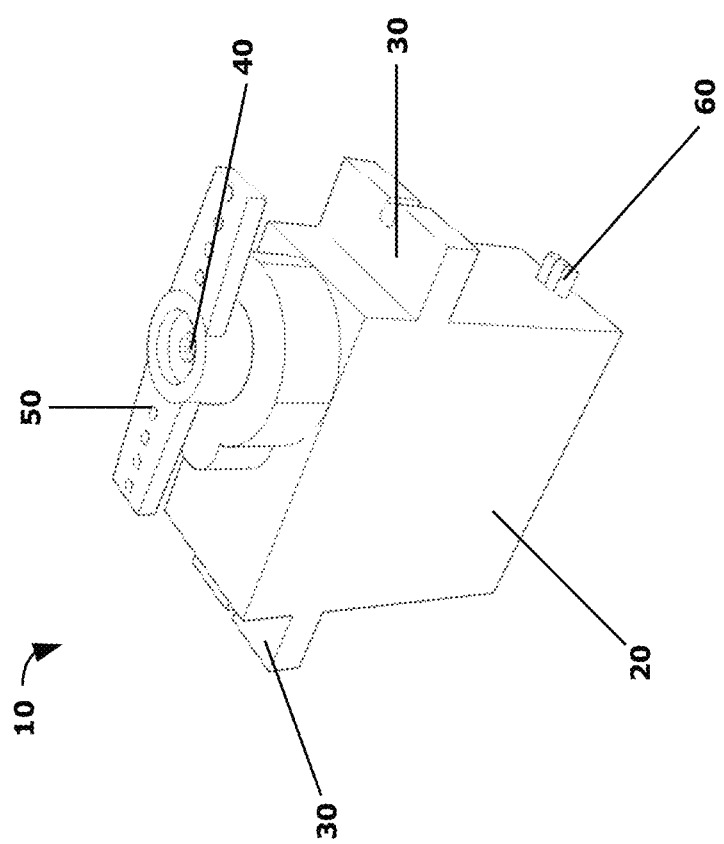
FIG. 1 shows a conventional servo with mounting tabs and a servo arm/horn.
Figure 2:
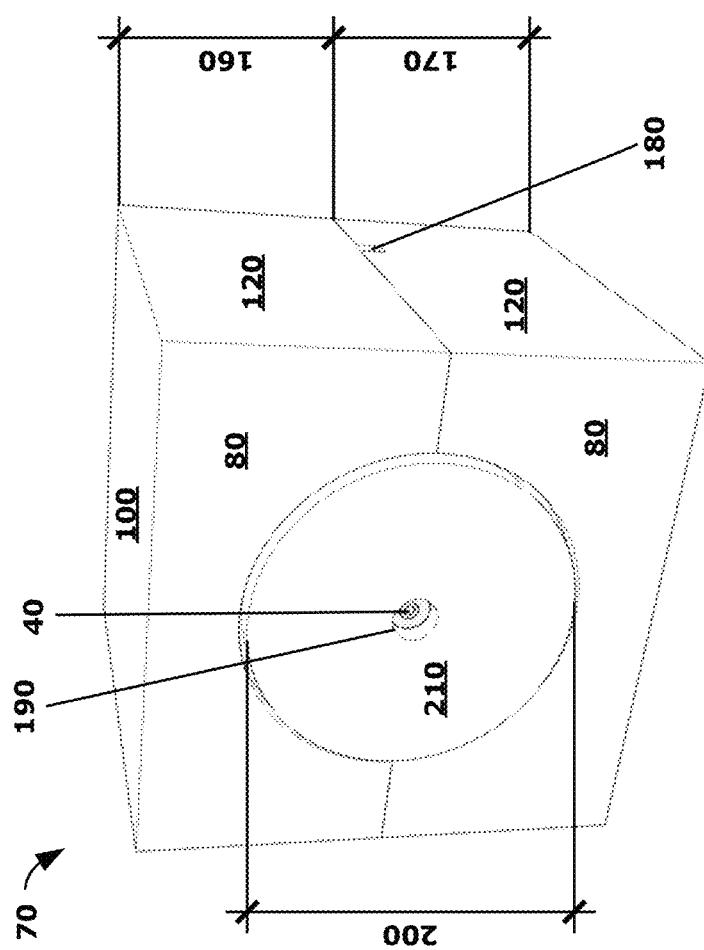
FIG. 2 shows a front perspective view of a case for a servo in accordance with an embodiment of the present invention.
Figure 3:
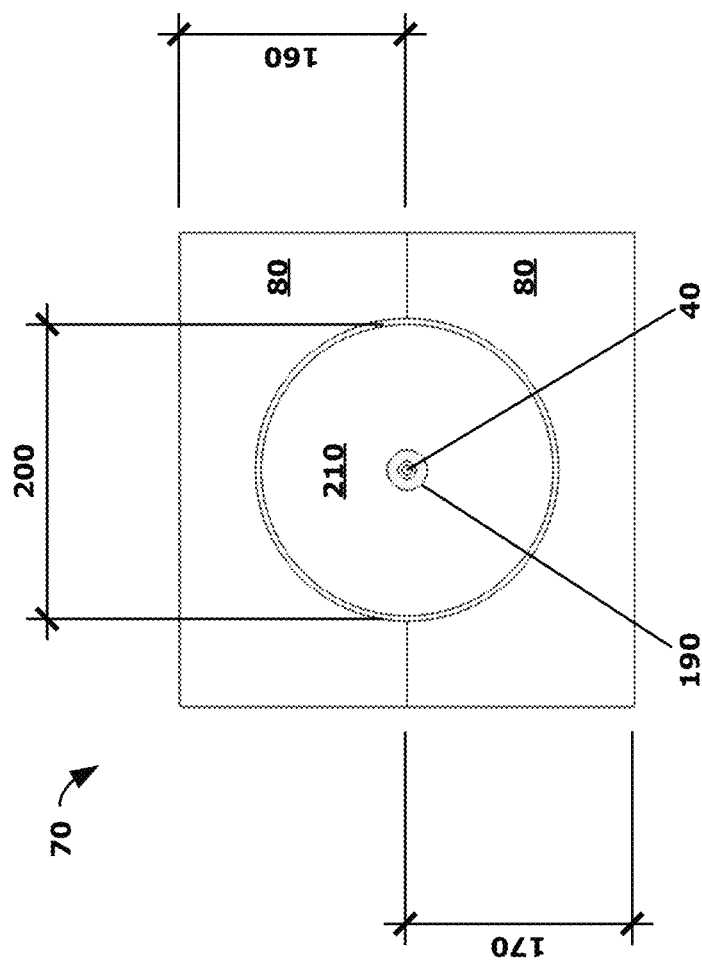
FIG. 3 shows a front view of the case of FIG. 2.
Figure 4:
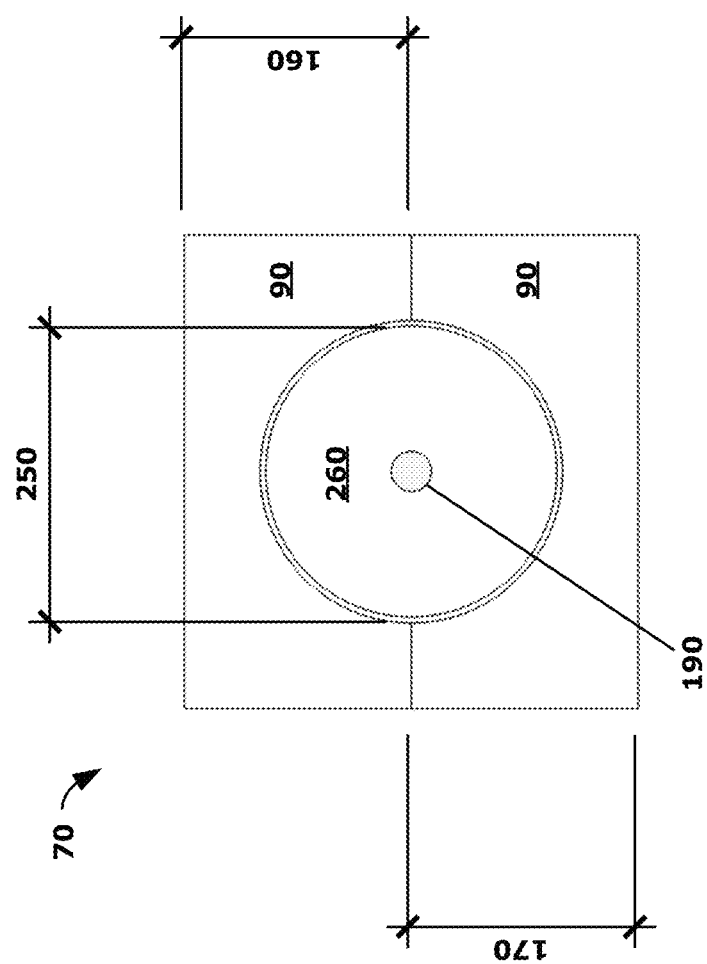
FIG. 4 shows a rear view of the case of FIG. 2.
Figure 5:
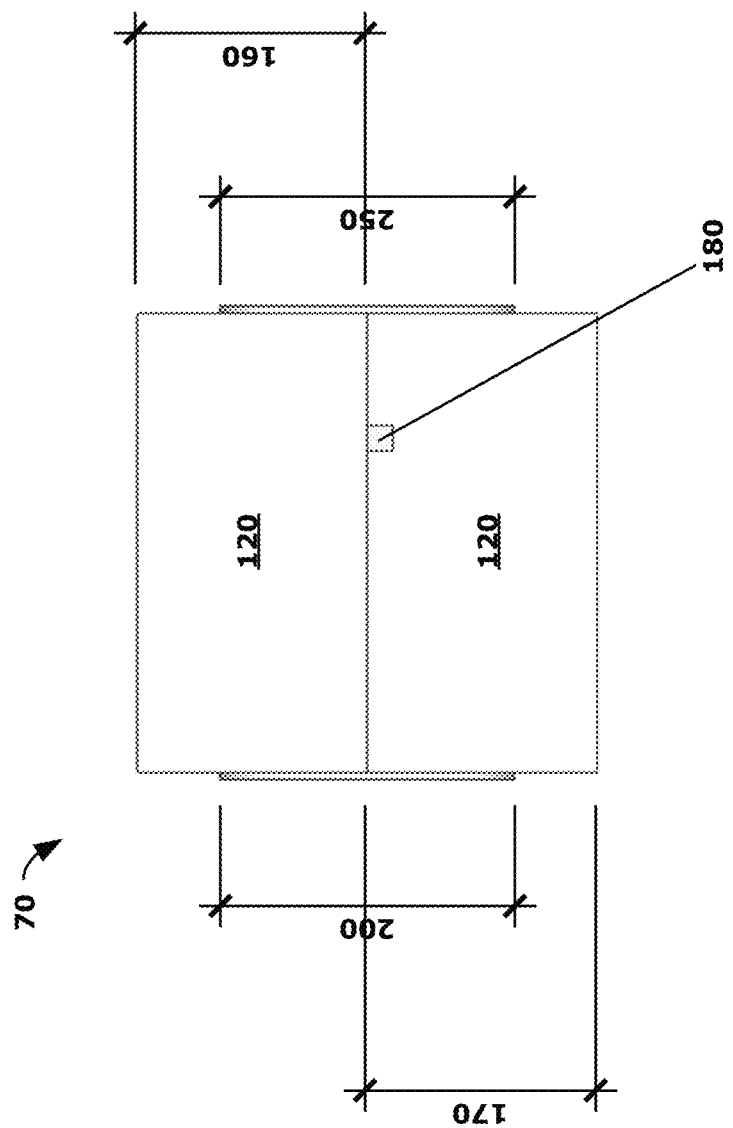
FIG. 5 shows a right-hand side view of the case of FIG. 2.
Figure 6:
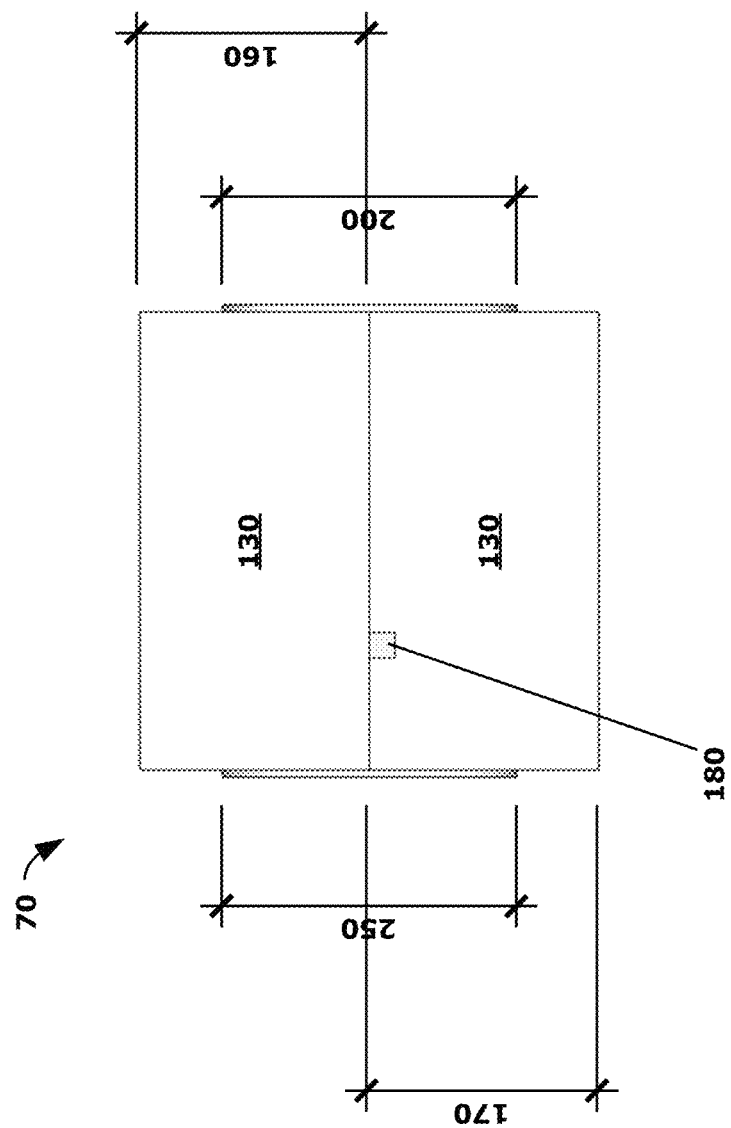
FIG. 6 shows a left-hand side view of the case of FIG. 2.
Figure 13:
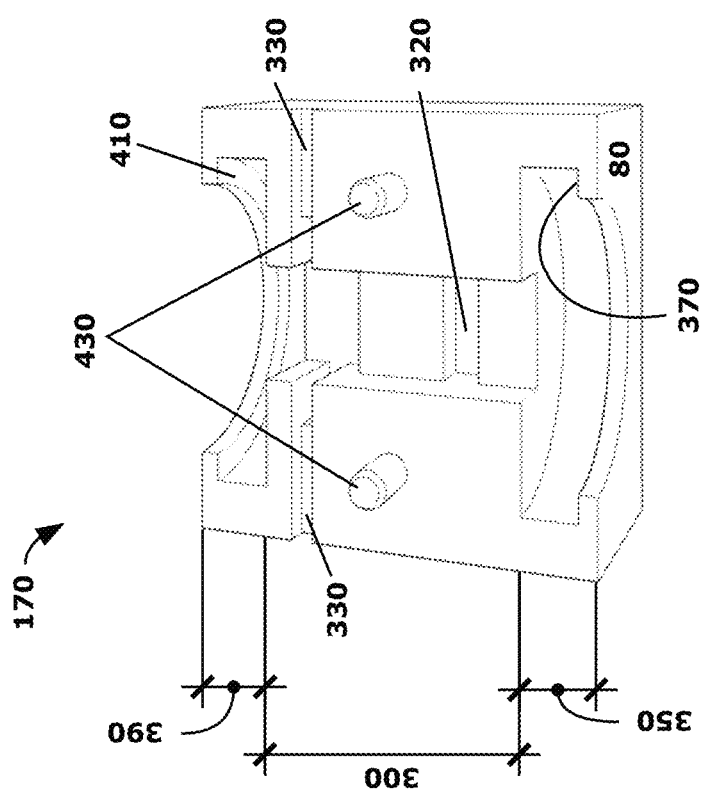
FIG. 13 shows a top front perspective view of the interior of the bottom portion of the case of FIG. 2 without the servo and the front and rear rotating discs.
Figure 14:
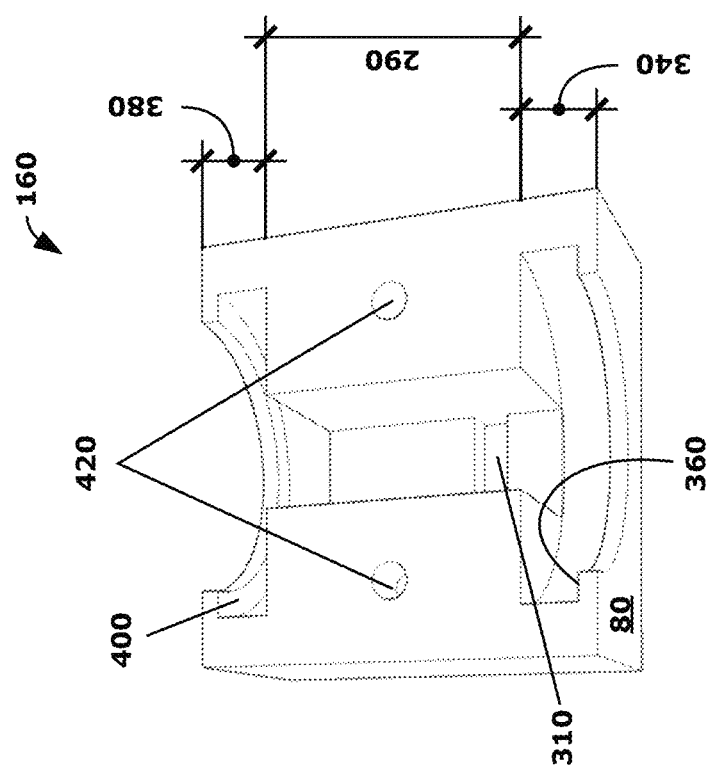
FIG. 14 shows a top front perspective view of the interior of the top portion of the case of FIG. 2 for mating with the bottom portion of the case shown in FIG. 13.
Figure 15:
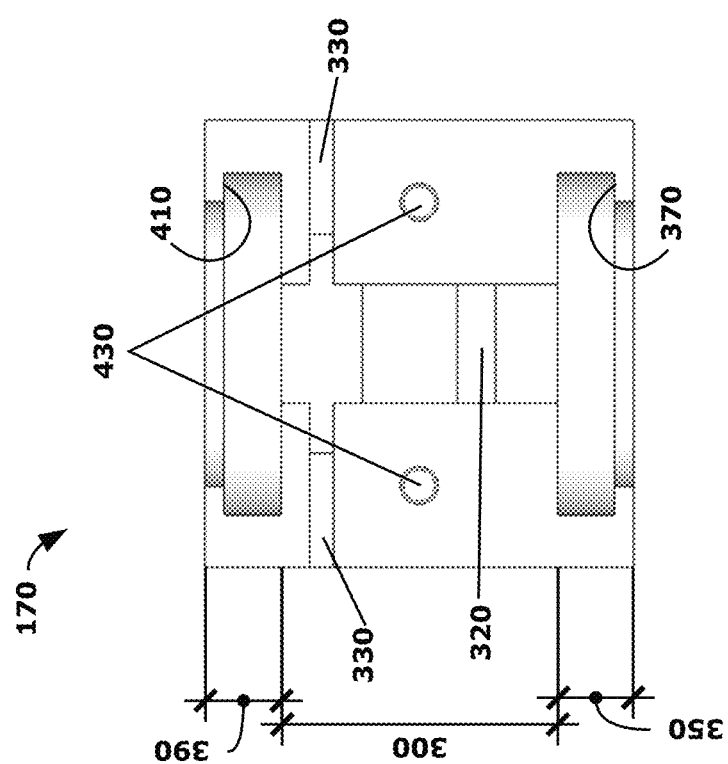
FIG. 15 shows a top view of the interior of the bottom portion of the case of FIG. 2 without the servo and the front and rear rotating discs.
Figure 16:
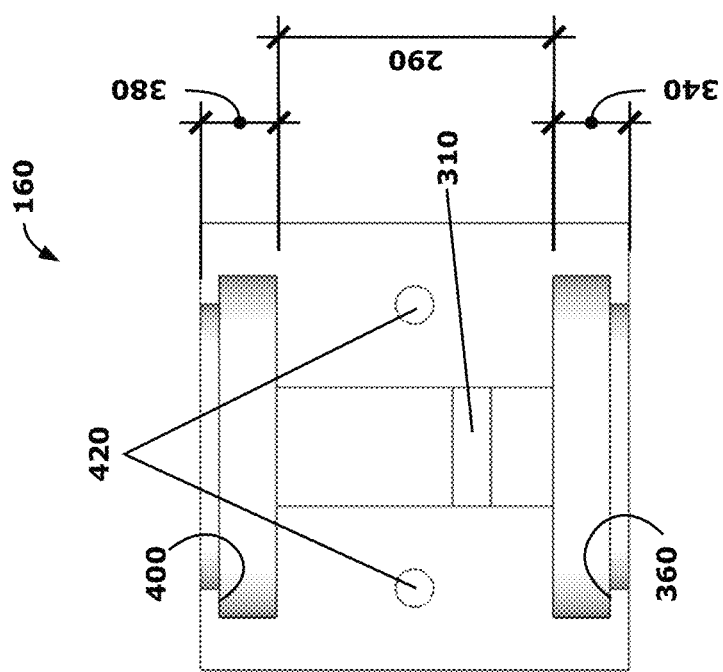
FIG. 16 shows a top view of the interior of the top portion of the case of FIG. 2 for mating with the bottom portion of the case shown in FIG. 15.
Figure 18:
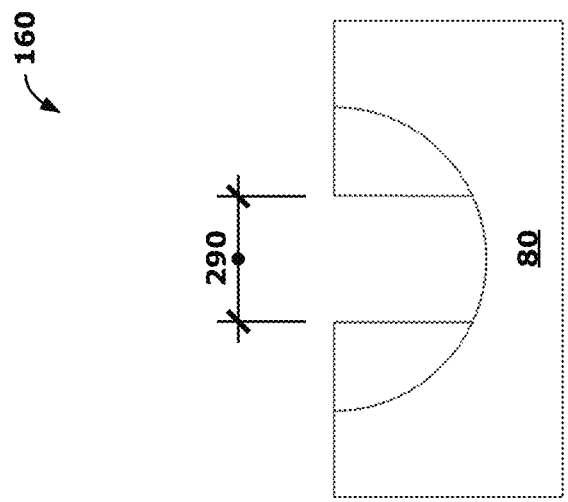
FIG. 18 shows a front view of the top portion of the case of FIG. 2 for mating with the bottom portion of the case shown in FIG. 17.
Figure 17:
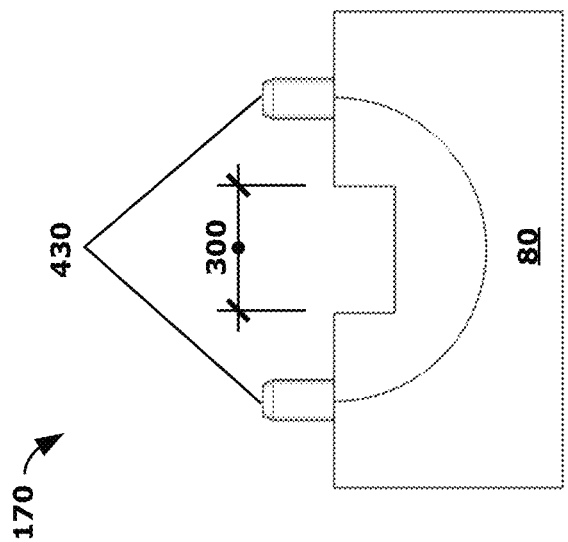
FIG. 17 shows a front view of the bottom portion of the case of FIG. 2 without the servo and the front and rear rotating discs.
Figure 20:
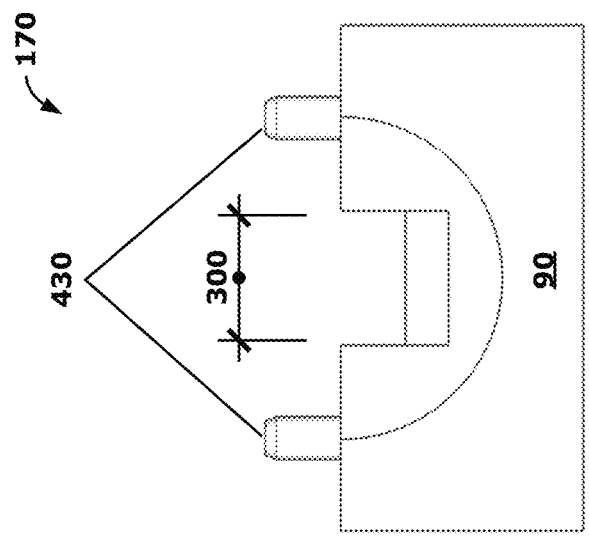
FIG. 20 shows a rear view of the bottom portion of the case of FIG. 2 without the servo and the front and rear rotating discs for mating with the top portion of the case shown in FIG. 19.
Figure 19:
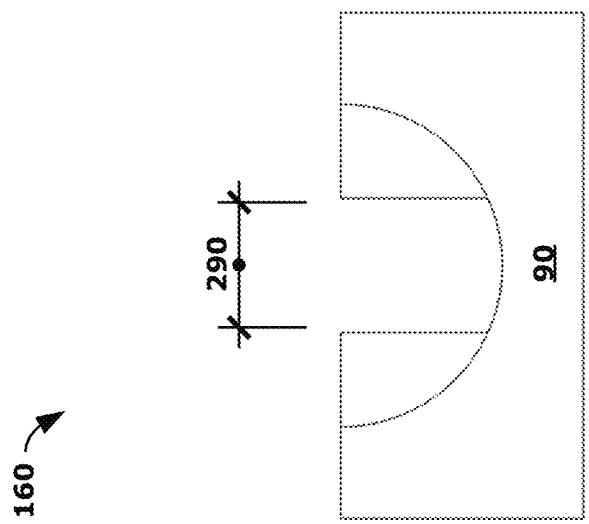
FIG. 19 shows a rear view of the top portion of the case of FIG. 2.
Figure 22:
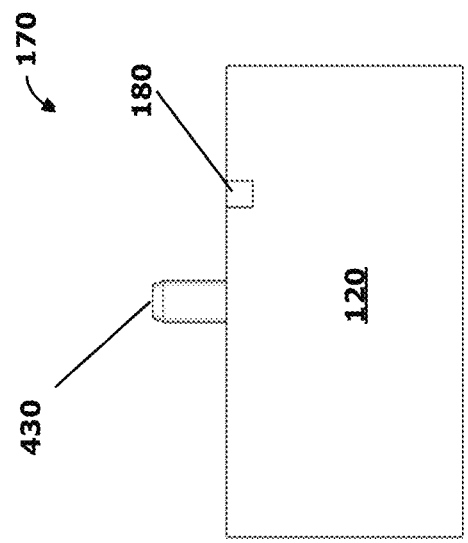
FIG. 22 shows a right-hand side view of the bottom portion of the case of FIG. 2 without the servo and the front and rear rotating discs.
Figure 21:
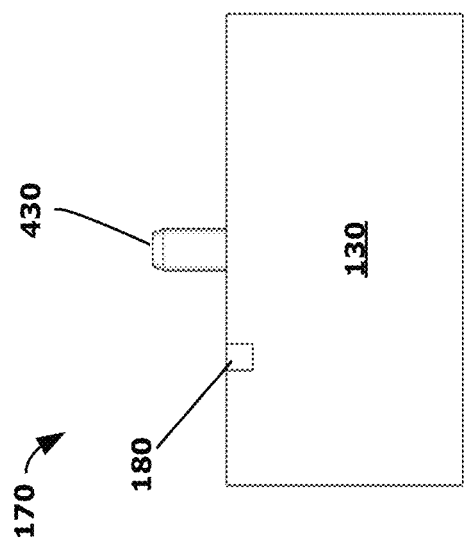
FIG. 21 shows a left-hand side view of the bottom portion of the case of FIG. 2 without the servo and the front and rear rotating discs.
Figure 23:
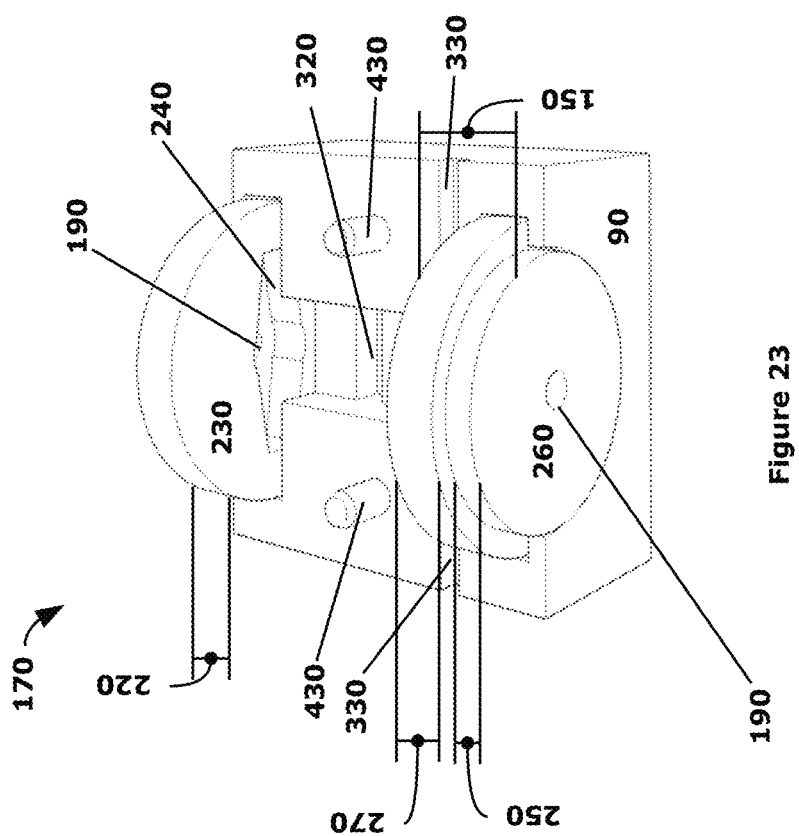
FIG. 23 shows a top rear perspective view of the interior of the bottom portion of the case of FIG. 2 without the servo but with the front and rear rotating discs.
Figure 24:
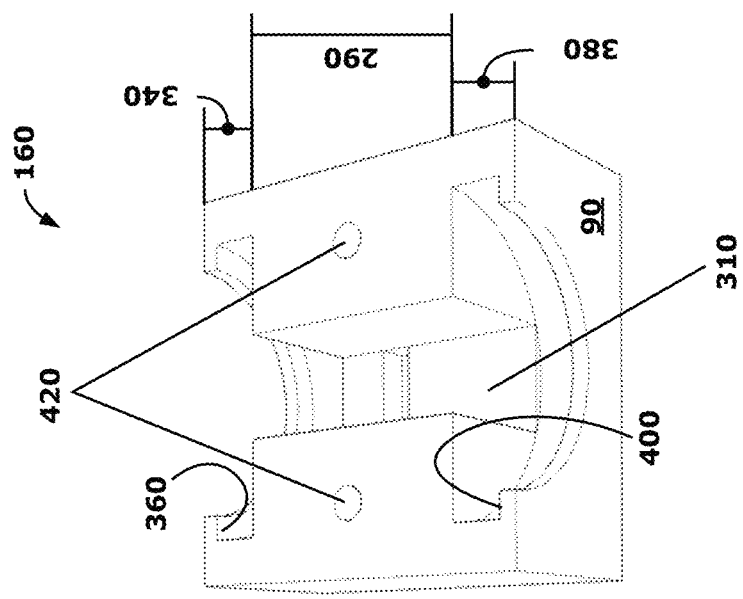
FIG. 24 shows a to rear perspective view of the interior of the top portion of the case of FIG. 2 for mating with the bottom portion of the case shown in FIG.23.
Figure 25:
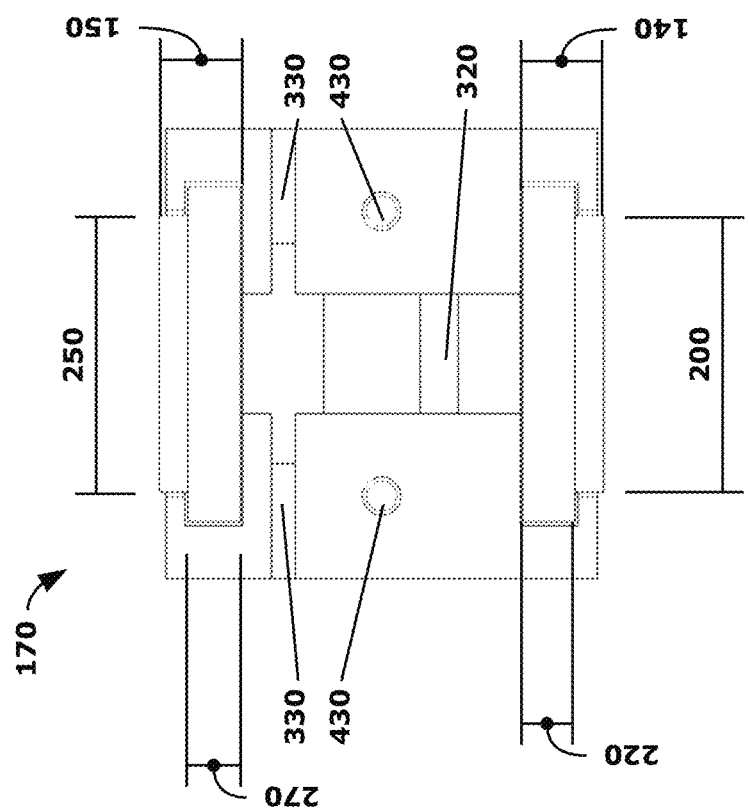
FIG. 25 shows a top view of the interior of the bottom portion of the case of FIG. 2 without the servo but with the front and rear rotating discs.
Figure 26:
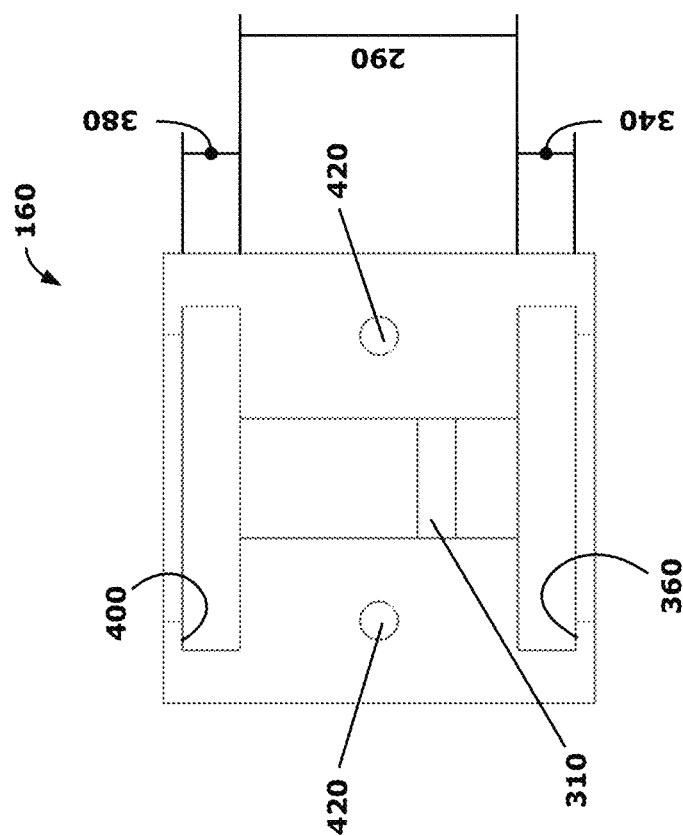
FIG. 26 shows a top view of the interior of the top portion of the case of FIG. 2 for mating with the bottom portion of the case shown in FIG.25.

Referring to FIG. 1, there is provided a prior art hobby servo generally referred to as 10, globally available in various standard sizes proving controllable rotational movement through a large variety of radio and micro controllers. The servo 10 comprises a housing 20, containing the internal electronic components of the servo 10, which housing 20 follows standard sizing within various size categories, such as for example, micro, mini and standard. The servo 10 also comprises mounting tabs 30 providing standard location of tab and hole patterns. The servo 10 also comprises a splined output shaft 40 with a varying number of teeth depending on the manufacturer. Common teeth numbers in the art are 23, 24 and 25. The shaft 40 may be made from any material known in the art including plastic, composite or metal. The shaft 40 provides a threaded center hole to allow for mounting of an arm/horn 50 of the servo 10. The arm/horn 50 is available in a variety of sizes, shapes and/or configurations and may take on any size, shape and/or configuration known to persons skilled in this art and may be used to transfer the rotational movement of the shaft 40 to an object. As discussed above, a gear (not shown), having a toothed receiver portion, may be engaged to the output shaft 40 of the servo 10. The servo 10 also comprises wires 60 for connecting the servo 10 to power and to a controller (not shown). In this embodiment, the servo 10 is shown as a hobby servo but any size and type of servo known to persons skilled in this art may be used, including an industrial servo.

Now referring to FIGS. 2 to 8, there is provided a case 70 for a servo 10 in accordance with an embodiment of the present invention. In this embodiment, the case 70 comprises a front end having a front face 80, a rear end having a rear face 90, a top end having a top face 100, a bottom end having a bottom face 110, a right-hand side having a right-hand side face 120 and a left-hand side having a left-hand side face 130. In this embodiment, the case 70 comprises a front rotating disc 140 at the front end projecting out from the front face 80 and an opposing rear rotating disc 150 at the rear end projecting out from the rear face 90. In another embodiment, the case 70 does not comprise a rear rotating disc 150. In this embodiment, the case 70 is provided by two mating portions, a top portion 160 and a bottom portion 170. The case 70 comprises apertures 180 on opposing right-hand and left-hand sides of the bottom portion 170 for the power and control wires 60 of the internal servo 10. In this embodiment, the case 70 is shown in the shape of a cube but the overall shape, configuration and size of the case 70 may vary based on the size and type of the servo 10 and/or on the type of application required. For example, case 70 may have a single continuous face or may have any number of faces, corners and/or edges, and may be in the form of any geometric shape known to persons skilled in this art, such as, for example, but not limited to, a square prism, a rectangular prism, a triangular prism, a sphere, a cylinder, an ellipsoid, a cone, etc.

The front rotating disc 140 directly or indirectly engages with the output shaft 40 of the internal servo 10 and is driven thereby. The rear rotating disc 150, when present, may or may not be driven by the internal servo 10 and may provide support for the driven side of the case 70 and balanced support for motion and connectivity to other cases 70 or to any other piece of hardware the users provide. The front rotating disc 140 comprises a centre hole 190 which provides access to the output shaft 40 of the internal servo 10 (shown in FIGS. 2 and 3) and for centering attached hardware. In this embodiment, the rear rotating disc 150 also comprises a centre hole 190. In another embodiment, the rear rotating disc 150 does not comprise a centre hole 190.

Now referring to FIGS. 9 and 10, there is provided the front rotating disc 140. As mentioned above, the front rotating disc 140 comprises a centre hole 190 which provides access to the shaft 40 of the internal servo 10 and for centering any attached hardware. The front rotating disc 140 also has a front portion 200 with a front face 210 and a rear portion 220 with a rear face 230. In this embodiment, the front portion 200 of the front rotating disc 140 has a smaller diameter aspect than the rear portion 220, thus creating a step or ledge in the front rotating disc 140 transitioning from the front portion 200 to the rear portion 220. The front face 210 may provide a mounting surface into which any number of holes may be drilled, such as an array or arrays of holes, or upon which an adhesive such as glue may be applied, to mount or connect an additional case 70 or other additional hardware and/or building components that the user may provide depending on the application.

Front rotating disc 140 has a cavity or boss 240 formed in the rear face 230 thereof. In this embodiment, the cavity or boss 240 is shown to be configured to matingly engage a propeller-shaped servo arm/horn 50 attached to the output shaft 40 of the servo 10. However, the cavity or boss 240 may be configured to matingly engage any size and/or shape of arm/horn 50 attached to the output shaft 40 of the servo 10 known to persons skilled in this art, any size and/or shape of gear attached to the output shaft 40 of the servo 10 known to persons skilled in this art or any size and/or shape of output shaft 40, including any size, shape and/or number of splines or teeth, known to persons skilled in this art, for a direct engagement with the output shaft 40. The cavity or boss 240 allows for friction fit of the output shaft 40 of the internal servo 10, gear or arm/horn 50, therewithin. As discussed above, the front rotating disc 140 is driven by the output shaft 40 of the internal servo 10. As discussed, the cavity or boss 240 may allow for the friction fit of any servo output shaft 40, gear or arm/horn 50 and the size and/or shape of the cavity or boss 240 may be modified, such as by molding, stamping, cutting, etc., to fit any output shaft 40, gear or arm/horn 50. Likewise, the size and/or shape of the output shaft 40, gear or arm/horn 50 may be modified such as by cutting, trimming etc., to fit the cavity or boss 240. Alternative or additional front rotating discs 140 may be provided with various cavities or bosses 240 in any number and having various sizes, shapes and/or configurations to accommodate any number, size, shape or configuration of output shaft 40, gear or arm/horn 50 provided by various manufacturers or by the user depending on the type of application.

Now referring to FIGS. 11 and 12 there is provided the rear rotating disc 150. The rear rotating disc 150 has a front portion 250 with a front face 260 and a rear portion 270 with a rear face 280. In this embodiment, the front portion 250 of the rear rotating disc 150 has a smaller diameter aspect than the rear portion 270, thus creating a step or ledge in the rear rotating disc 150 transitioning from the front portion 250 to the rear portion 270. The front face 260 of the rear rotating disc 150 may provide a mounting surface into which any number of holes may be drilled, such as an array or arrays of holes, or upon which an adhesive such as glue may be applied, to mount or connect an additional case 70 or other additional hardware and/or building components that the user may provide depending on the application. In another embodiment, the rear rotating disc 150 is identical to the front rotating disc 140 having a cavity or boss formed in the rear face 280 thereof. As discussed above, the rear rotating disc 150 may or may not be driven by the internal servo 10 and may provide support for the driven side of the case 70 and balanced support for motion and connectivity to other cases 70 or to any other piece of hardware and/or building component the users provide depending on the application.

Figure 39:
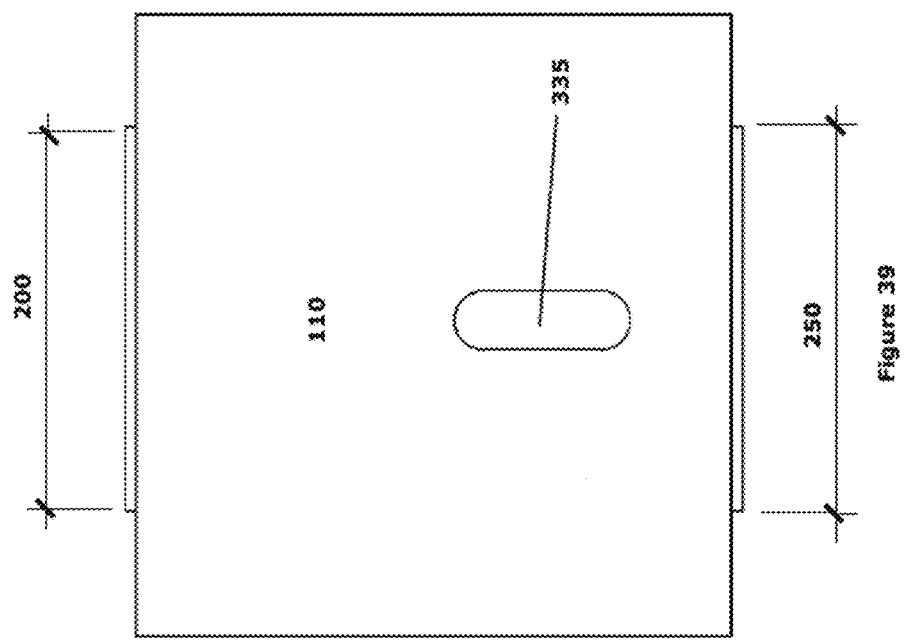
FIG. 39 shows a bottom view of a case for a servo in accordance with another embodiment of the present invention.
Figure 40:
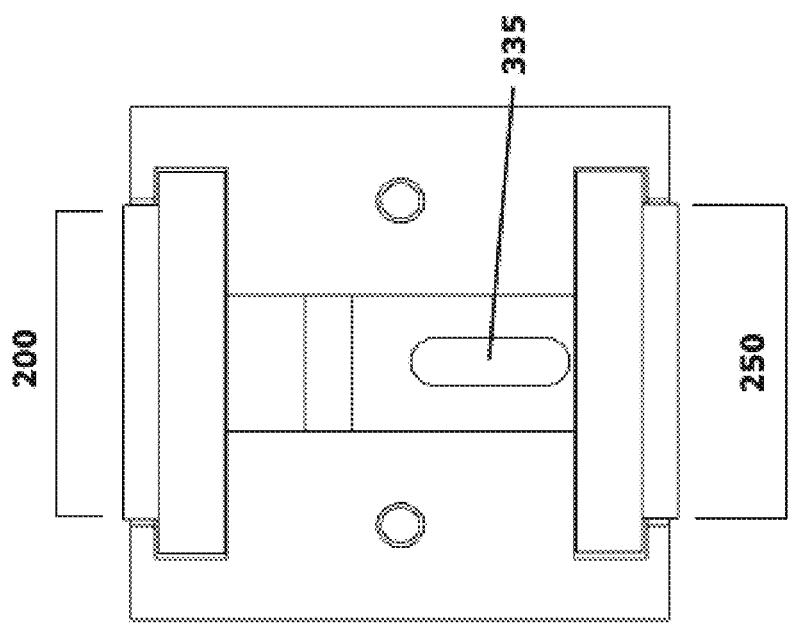
FIG. 40 shows a top view of the interior of the bottom portion of the case of FIG. 39 without the servo but with the front and rear rotating discs.

Now referring to FIGS. 13 to 22, there is provided the case 70, in accordance with an embodiment of the present invention, shown without the front and rear rotating discs 140 and 150 and separating the top portion 160 from the bottom portion 170 to show the interior of the case 70. Each of the top and bottom portions 160 and 170, respectively, have formed therein an internal cavity or enclosure 290 and 300, respectively for providing centering and a mating fit of servo 10 therein. The overall shape, configuration and size of the internal cavities or enclosures 290 and 300 may vary based on the size, shape and configuration of the servo 10. In this embodiment, the internal cavity or enclosure 290 formed in the top portion 160 and the internal cavity or enclosure 300 formed in the bottom portion 170 are offset to allow for centering of the servo 10 within the case 70 based on the offset of the splined output shaft 40 of the servo 10. Each of the internal cavities or enclosures 290 and 300 have formed therein further cavities or recesses 310 and 320, respectively, which fit the mounting tabs 30 of the servo 10. The further cavities or recesses 310 and 320 provide friction fit and alignment of the servo 10 within the case 70. The positioning, size, shape and configuration of the cavities or recesses 310 and 320 may vary based on the size, shape and configuration of the servo 10 and its mounting tabs 30. The internal cavity or enclosure 300 has formed therein channels 330 to fit and guide the power and control wires of the servo 10 to the outside of the case 70. The positioning, size, shape and configuration of the channels 330 may vary based on the size, shape and configuration of the servo 10 and its power and control wires 60. For example, in one embodiment, rather than channels 330, the internal cavity or enclosure 300 has formed therein, for example in the bottom portion 170, an aperture 335 as depicted in FIGS. 39 and 40, to fit and guide the power and control wires of the servo 10 to the outside of the case 70. The positioning, size, shape and configuration of the aperture 335 may vary based on the size, shape and configuration of the servo 10 and its power and control wires 60.

Each of the top and bottom portions 160 and 170, respectively, at the front end and near the front face 80, have formed therein a front bushing track 340 and 350, respectively with a front shoulder 360 and 370, respectively for encasing and retaining the larger diameter rear portion 220 of front rotating disc 140 which is driven by the shaft 40, gear or arm/horn 50 of the servo 10. Likewise, each of the top and bottom portions 160 and 170, respectively, at the rear end and near the rear face 90, have formed therein a rear bushing track 380 and 390, respectively with a rear shoulder 400 and 410, respectively for fitting, encasing and retaining the larger diameter rear portion 270 of the rear rotating disc 150.

The top portion 160 has alignment holes 420 formed therein. The bottom portion 170 has alignment pins 430 formed therein. Alignment pins 430 of the bottom portion 170 matingly align with, and frictionally fit within, alignment holes 420 of the top portion 160 when the top and bottom portions 160 and 170, respectively, are assembled together.

Now referring to FIGS. 23 to 26, there is provided the case 70, shown with the front and rear rotating discs 140 and 150 seated within the front and rear bushing tracks 350 and 370, respectively of the bottom portion 170 and separating the top portion 160 from the bottom portion 170 to show the interior of the case 70. Front rotating disc 140 is situated within the front bushing track 350 such that the rear portion 220 of the front rotating disc 140 is seated in the portion of the front bushing track 350 created by the front shoulder 370 and the front portion 200 of the front rotating disc 140 projects out from the front face 80 of the case 70. Rear rotating disc 150 is situated within the rear bushing track 390 such that the rear portion 270 of the rear rotating disc 150 is seated in the portion of the rear bushing track 390 created by the rear shoulder 410 and the front portion 250 of the rear rotating disc 150 projects out from the rear face 90 of the case 70.

Figure 27:
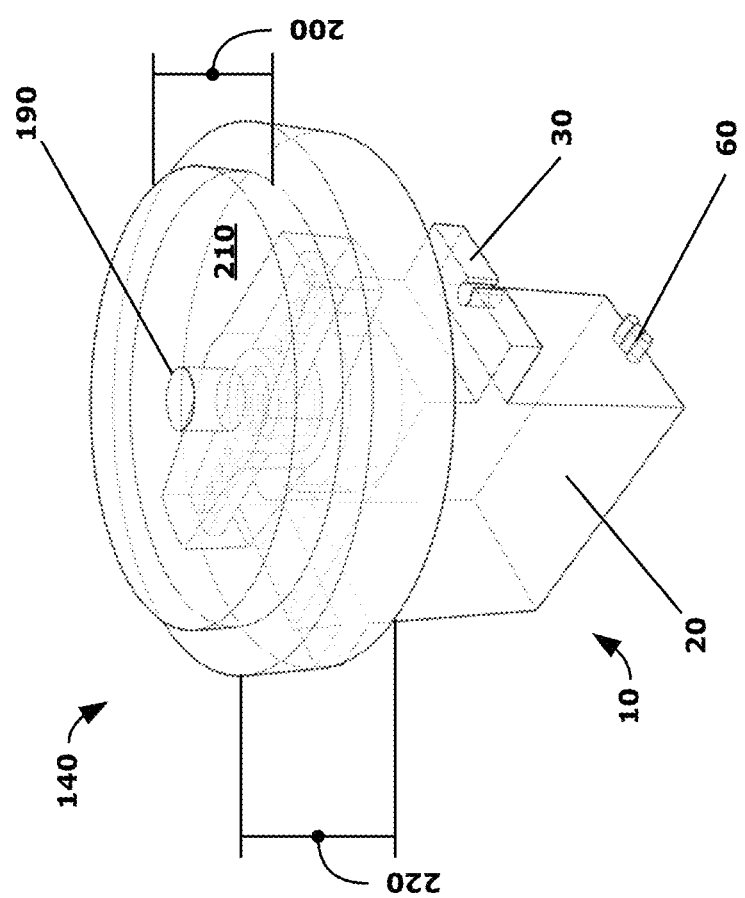
FIG. 27 shows a perspective view of the front rotating disc of the case of FIG. 2 mounted on the arm/horn of the conventional servo of FIG. 1.

Now turning to FIG. 27, there is provided a servo 10 with its arm/horn 50 fit into the cavity or boss 240 formed in the rear face 230 of the rear portion 220 of the front rotating disc 140.

Now turning to FIGS. 28 to 37, there is provided a servo 10 fit into the internal cavity or enclosure 300 of the bottom portion 170 of the case 70. The output shaft 40 of the servo 10 is aligned with the center of case 70. The arm/horn 50 of the servo 10 is friction fit into the cavity or boss 240 formed in the rear face 230 of the rear portion 220 of the front rotating disc 140. In this embodiment, when the servo 10 is fit into the internal cavity or enclosure 300 of the bottom portion 170 of the case 70 and the top portion 160 is matingly engaged with the bottom portion 170, the case 70 fully surrounds or encloses servo 10. In another embodiment, case 70 surrounds or encloses only a portion of servo 10. It will be appreciated that in some examples, the case 70 may be part, or comprised in, the servo 10 and that in these examples, the case 70 may then be considered as a housing of the servo 10.

In the specific embodiment illustrated in the drawings, projecting from each of two faces of the six-sided case 70, namely the front face 80 and the rear face 90, there is a rotating disc, namely the front rotating disc 140 and the rear rotating disc 150, respectively, that support the motion from, and the load on, the output shaft 40 of a servo 10 contained within the case 70. At least one of the discs, namely the front rotating disc 140, is powered and driven by, and transfers the motion from, the output shaft 40 of the servo 10. The rear rotating disc 150 may or may not be driven by the output shaft 40 of the servo 10. The case 70 is split into two portions, namely the top portion 160 and the bottom portion 170, allowing for the case 70 to be opened to insert and/or remove the servo 10. Each of the top and bottom portions 160 and 170, respectively have an internal cavity enclosure formed therein which holds or encloses the servo 10, such as, for example, by friction fit and/or by one or more mechanical fixings, and uses the standard mounting tabs 30 to align the servo 10 within the case 70 so that the output shaft 40, gear and/or arm/horn 50 is centered within the cavity or boss 240 of the front rotating disc 140.

In accordance with embodiments of the present invention, the material for the case 70 may be any material known to persons skilled in this art.

In accordance with embodiments of the present invention, each of the components of the case 70 may be made from the same material or from different materials as would be understood by persons skilled in the art.

In accordance with embodiments of the present invention, the case 70 may be made from any material known by persons skilled in this art to be suitable for the uses intended, such as, for example, but not limited to, wood, plastic, metal, resins, ceramic etc., or a combination of materials. In some embodiments, the case 70 may be made from wood and/or plastic due to the workability of the material(s) and common tools available to the average user. In accordance with embodiments of the present invention, the case 70 may be manufactured by any process known to persons skilled in this art to be suitable depending on the material used for the case 70, such as, for example, but not limited to, cutting, milling, molding, additive manufacturing such as by 2D printing etc., and depending on the type of application required by the user.

In accordance with embodiments of the present invention, the front and rear rotating discs 140 and 150, respectively may be composed of the same material, and/or have the same finish as, the front (340, 350) and rear (380, 390) bushing tracks in which they are seated and within which they ride/rotate. Being composed of the same material and/or having the same finish may allow for an acceptable coefficient of friction to provide smooth riding/rotating of the front and rear rotating discs 140 and 150, respectively within the front (340, 350) and rear (380, 390) bushing tracks, respectively, which may reduce the load on, and/or not reduce the strength of, the servo 10. However, persons skilled in this art would understand that the front and rear rotating discs 140 and 150, respectively may be composed of a different material and/or may be of a different finish from, the front (340, 350) and rear (380, 390) bushing tracks, respectively in which they ride as long as the respective materials and/or finish allow for an acceptable coefficient of friction between the front and rear rotating discs 140 and 150, respectively and the front (340, 350) and rear (380, 390) bushing tracks, respectively in which they ride/rotate to provide substantially smooth riding/rotating of the front and rear rotating discs 140 and 150, respectively within the front (340, 350) and rear (380, 390) bushing tracks, respectively, without significantly increasing the load on, and/or reducing the strength of, the servo 10.

In accordance with embodiments of the present invention, various components of the case 70, such as the front and rear rotating discs 140 and 150, respectively and the front (340, 350) and rear (380, 390) bushing tracks, respectively, may be manufactured from metal which may result in a more robust case 70.

To assemble the case 70 enclosing the servo 10, the output shaft 40, gear or arm/horn 50 of the servo 10 is fit within the mating cavity or boss 240 of the front rotating disc 140. The servo 10 with the engaged front rotating disc 140 is fit within the cavity or enclosure 300 of the bottom portion 170 of the case 70 such that the front rotating disc 140 is seated within the front bushing track 350, the mounting tabs 30 fit within the recess 320 and the power and control wires fit within channels 330. The rear rotating disc 150 is seated within the rear bushing track 390. The top portion 160 is mated with the bottom portion 170 by inserting the alignment pins 430 within the alignment holes 420. Once the case 70 has been assembled enclosing the servo 10, the servo 10 may be actuated to rotate the output shaft 40, which in turn rotates the front rotating disc 140 in the front bushing track 340 and 350.

One, two or more cases 70, in accordance with embodiments of the present invention, with at least one of the cases 70 at least partially enclosing a servo 10, may alone, or together in combination with other building components, be arranged to make-up a moveable structure or component. For example, one, two or more cases 70, in accordance with embodiments of the present invention, with at least one of the cases 70 at least partially enclosing a servo 10, may be combined and arranged together and/or combined and arranged with other building components to make-up, for example, a leg or an arm of, for example, a robot. The one, two or more cases 70, in accordance with embodiments of the present invention, with at least one of the cases 70 at least partially enclosing a servo 10, may be arranged to make-up, for example, a robot leg such that the one, two or more cases 70, provide the required actuated degrees of freedom of the leg.

Figure 38:
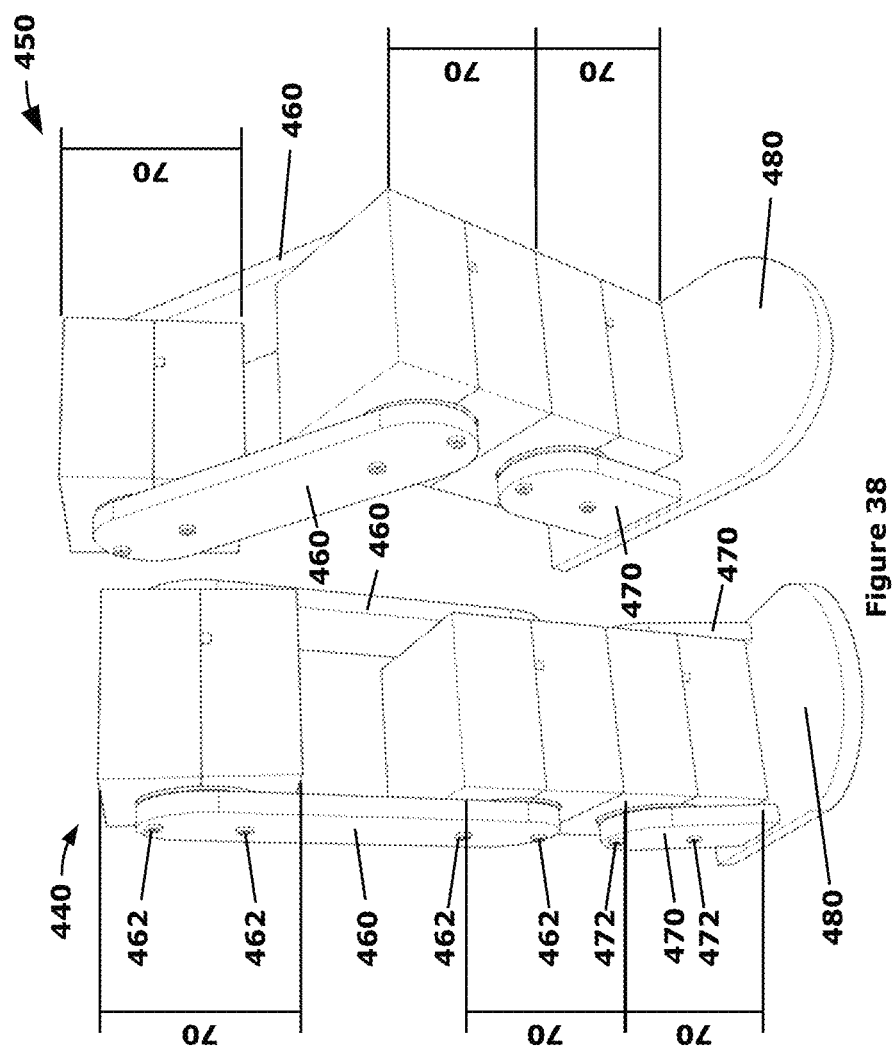
FIG. 38 shows a perspective view of several cases for servos in accordance with an embodiment of the present invention used in an application of moveable robotic legs.

FIG. 38 shows a front perspective view of exemplary left and right legs 440 and 450 that may be part of a legged robot or walking machine. In this example, each of legs 440 and 450 comprise three cases 70, upper linkages 460, lower linkages 470 and a foot 480. Each upper linkage 460 of each of legs 440 and 450 includes a two-bar or link linkage, arranged on opposing sides of an upper case 70 and a middle case 70, e.g., to be parallel to each other, which connects the upper case 70 to the middle case 70. The upper case 70 and the middle case 70 can be part of the upper linkage 460 to form an upper pair of two-bar (or two-link) linkages 460. In other words, the upper two-bar linkages 460 are formed by the upper case 70, which is connected via a first link or bar 460 to the middle case 70, which is connected to the upper case 70 by a second link or bar 460. The pair of upper two-bar linkages 460 are arranged to be parallel to each other.

The length of each of the bars or links of the upper linkages 460 is substantially the same, which results in a substantially parallel arrangement of the upper case 70 and the middle case 70 and each of the bars of the upper linkages 460.

It will be appreciated that, in other examples, the upper linkages 460 may include more than two bars. For example, the upper case 70 and the middle case 70 may be connected to each other by four links or bars, two links or bars arranged on opposing sides of the upper case 70 and the middle case 70, e.g., two pairs of upper four-bar linkages arranged to be parallel to each other.

Similarly, the lower linkages 470 include two bars or links, which connect the middle case 70 to a lower case 70. The middle case 70 and the lower case 70 can be part of the lower linkage 470 to form a lower pair of two-bar (or two-link) linkages 470. In other words, the lower two-bar linkages 470 are formed by the middle case 70, which is connected via a first link or bar 460 to the lower case 70, which is connected to the middle case 70 by a second link or bar 460. The pair of lower two-bar linkages 460 are arranged to be parallel to each other.

The length of each of the bars or links of the upper linkages 470 is substantially the same, which results in a substantially parallel arrangement of the middle case 70 and the lower case 70 and each of the bars of the lower linkages 470.

It will be appreciated that, in other examples, the lower linkages 470 may include more than two bars. For example, the middle case 70 and the lower case 70 may be connected to each other by four links or bars, two links or bars arranged on opposing sides of the middle case 70 and the lower case 70, e.g., two pairs of lower four-bar linkages arranged to be parallel to each other.

A ratio of the length of the bars or links of the upper linkages 460 to the length of the bars or links of the lower linkages 470 can be between 0.3 and 3.0. It will be appreciated that in this example, the middle case 70 and the lower case 70 are secured together such that their spatial relationship is constant.

In another example (not shown), each of legs 440 and 450 may comprise an additional second middle case 70 forming part of the knee joint. In this example, the additional second middle case 70 may be connected to, and located below, the first middle case 70 and the upper linkages 460 connect the upper case 70 to the uppermost first middle case 70 and the lower linkages 470 connect the additional lowermost second middle case 70 to the lower case 70. It will be appreciated that in this example, the uppermost first middle case 70 and the additional lowermost second middle case 70 are secured together such that their spatial relationship is constant.

Each of the legs 440 and 450 also comprise a foot 480, which in this example is a simple flat rectangle with a rounded front and attached to the lower case 70.

The upper case 70 can be considered as part of a hip joint of legs 440 and 450. The middle case 70 can be considered as part of a knee joint of legs 440 and 450. The lower case 70 connects the lower linkage 470 to the foot 480 and may be considered as an ankle of legs 440 and 450.

The upper case 70 of each of legs 440 and 450 is configured to provide one or more fixing points for fixing each of legs 440 and 450 to an external body, e.g. a part of the legged robot or walking machine. The hip joint, part of which is shown as the upper case 70, is configured to provide motion of at least parts of the upper linkage 460 (e.g., bars or links and the middle case 70) relative to the one or more fixing points or a part of the legged robot or walking machine and about one or more axes of the hip joint. The knee joint, which is shown as the middle case 70, is configured to provide motion of at least parts of the lower linkage 470 (e.g., bars or links and the lower case 70) relative to the upper linkage 460 and about one or more axes of the knee joint.

At least part of the upper linkage 460 can move in a first vertical plane, while at least part of the lower linkage 470 can move in a second vertical plane, which is nominally collinear to the first vertical plane. In other words, at least one axis of the knee joint is arranged to be substantially parallel to at least one axis of the hip joint.

In the examples where the at least one axis of the knee joint is arranged to be substantially parallel to the at least one axis of the hip joint, the legs 440 and 450 include one degree of freedom and can be moved in the sagittal planes. For example, one servo 10 may be included in the hip joint and another servo 10 may be included in the knee joint to cause the movement of at least parts of the upper linkage 460 and the lower linkage 470, as described above. In use, the output shafts 40 of the servos 10 can be connected or coupled via front rotating disc 140 of their respective cases 70 to one link or bar of each of the upper and lower linkages 460 and 470 to move or rotate the one link or bar of each of the upper and lower linkages 460 and 470. This in turn can cause movement of the other parallel link or bar of each of the upper and lower linkages 460 and 470 connected to the rear rotating disc 150 of their respective cases 70 and/or the middle and lower cases 70 of the upper and lower linkages 460 and 470.

In the example where the legs 440 and 450 comprise an additional second middle case 70 forming part of the knee joint, at least part of the upper linkage 460 can move in a first vertical plane, while at least part of the lower linkage 470 can move in a second vertical plane, which is nominally orthogonal to the first vertical plane. In other words, at least one axis of the knee joint is arranged to be substantially orthogonal to at least one axis of the hip joint. In this example, the legs 440 and 450 include two degrees of freedom and by utilizing two servos 10 can be moved in the coronal and sagittal planes of the legs 440 and 450. For example, one servo 10 may be included in the hip joint and another servo 10 may be included in the knee joint to cause the movement of at least parts of the upper and lower linkages 460 and 470, as described above. In use, the output shafts 40 of the servos 10 can be connected or coupled via the front rotating disc 140 of their respective cases 70 to at least one link of each of the upper and lower linkages 460 and 470 to move or rotate the link of each of the upper and lower linkages 460 and 470. This in turn can cause movement of the other parallel link or bar of each of the upper and lower linkages 460 and 470 connected to the rear rotating disc 150 of their respective cases 70 and/or the middle and lower cases 70 of the upper and lower linkages 460 and 470.

In an arrangement of legs 440 and 450 in an exemplary bipedal robot or walking machine, the robot or walking machine comprising a pelvis which is connectable to an upper body, each leg 440 and 450 includes a respective hip joint, upper linkage 460, knee joint, and lower linkage 470. Each leg 440 and 450 therefore comprises one joint which nominally creates movement in the sagittal plane (hip joints), and one joint which nominally creates movement in the coronal plane (knee joints). The knee joints operate orthogonally to the hip joints. In this example, each hip joint is configured to provide motion of each respective upper linkage 460 nominally in the sagittal plane, such as flexion or extension, of the bipedal robot and each knee joint is configured to provide motion of each respective lower linkage 470 nominally in the coronal plane, such as adduction or abduction, of the bipedal robot 200. It will be appreciated that in other examples the hip joint of each leg may be configured to provide motion of each respective upper link 460 nominally in the coronal plane of the biped robot and each knee joint of each leg may be configured to provide motion of each respective lower link 470 nominally on the sagittal plane of the biped robot.

As discussed, each leg comprises an upper linkage 460, and a lower linkage 470, as well as a foot 480. Each leg includes three cases 70 comprising one or more servos 10. The servos 10 are arranged in or on the leg, e.g. in a portion of the leg, such that the servos 10 provide three or fewer actuated degrees of freedom of the leg. Each leg 440 and 450 includes a first servo 10 in the upper case 70 for moving at least part of the upper linkage 460 of each respective leg. In this example, the upper case 70 of each leg 440 and 450, surround or encloses at least a portion of the servo 10, which may be provided in the form of a hip joint motor. In use, the hip joint motor of each leg 440 and 450 causes movement of at least part of the upper linkage 460 of each respective leg. Each leg can include a second servo 10, which may be provided in the form of a knee twist motor. The knee twist motor is provided in the uppermost first middle case 70 of each leg and is operable to cause twisting movement between the uppermost first middle case 70 and the lowermost second middle case 70. Each leg includes a third servo 10, which may be provided in the form of a knee joint motor. The knee joint motor of each leg may be positioned or seated in the lowermost second middle case 70. The knee joint motor causes movement of at least part of the lower linkage 470. In this example the upper case 70 and the lowermost second middle case 70 of each leg are of a first type. The uppermost first middle case 70 and the lower case 70 of each leg are of a second type. In this example, the lower case 70 may be rigidly connected to each foot 480 of the respective leg.

As discussed above, the upper linkages 460 utilize cases 70, in accordance with an embodiment of the present invention, wherein at least one of the cases 70, enclosing a servo 10, may be arranged or configured to operate and/or cause motion of the hip joint of the leg 440 or 450, another at least one case 70, enclosing a servo 10 may be arranged or configured to operate and/or cause motion of the knee joint of the leg 440 or 450 and still another at least one case 70, enclosing a servo 10 may be arranged or configured to operate and/or cause motion of the ankle joint of the leg 440 or 450.

Figure 28:
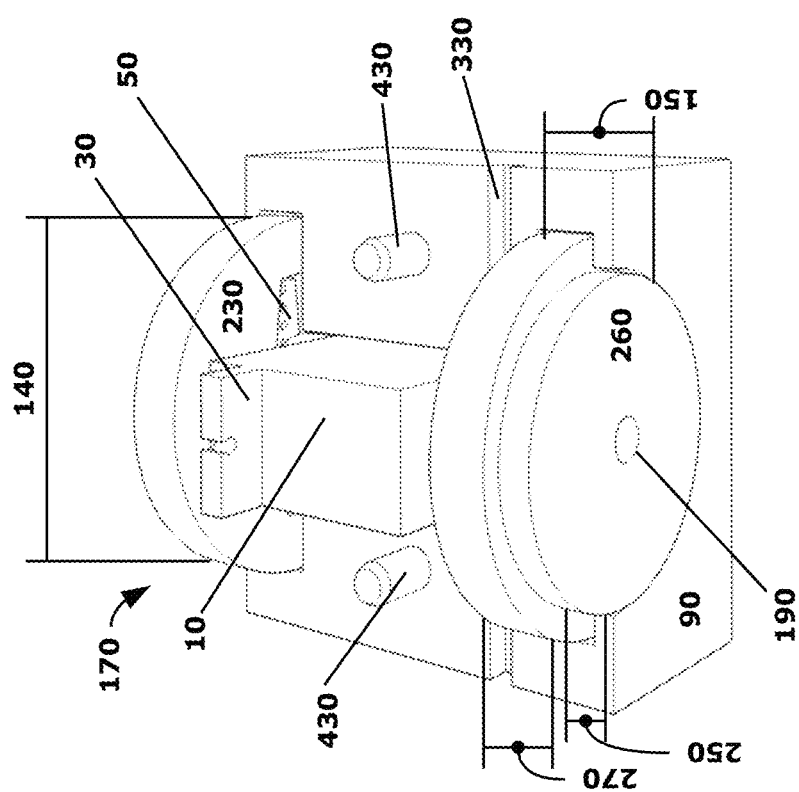
FIG. 28 shows a top rear perspective view of the interior of the bottom portion of the case of FIG. 2 containing the conventional servo of FIG. 1 and with the front and rear rotating discs.
Figure 29:
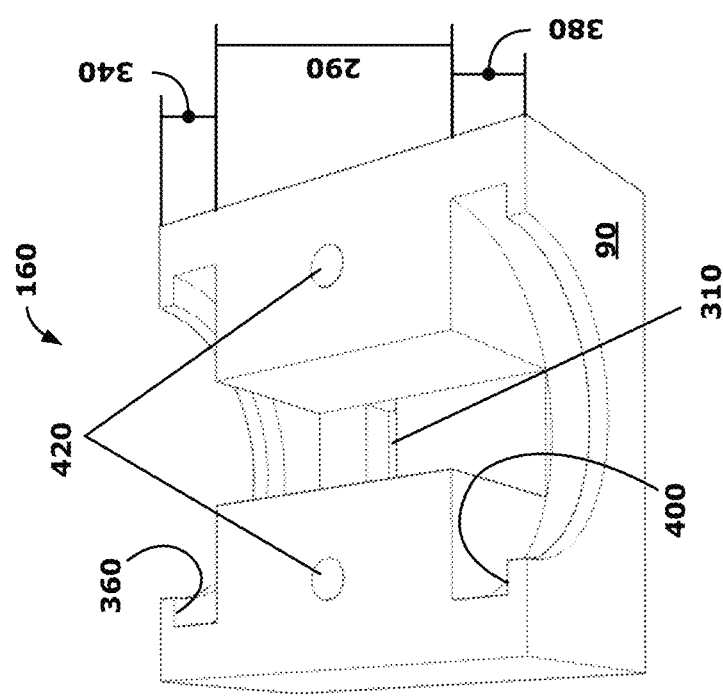
FIG. 29 shows a top rear perspective view of the interior of the top portion of the case of FIG. 2 for mating with the bottom portion of the case shown in FIG. 28.
Figure 30:
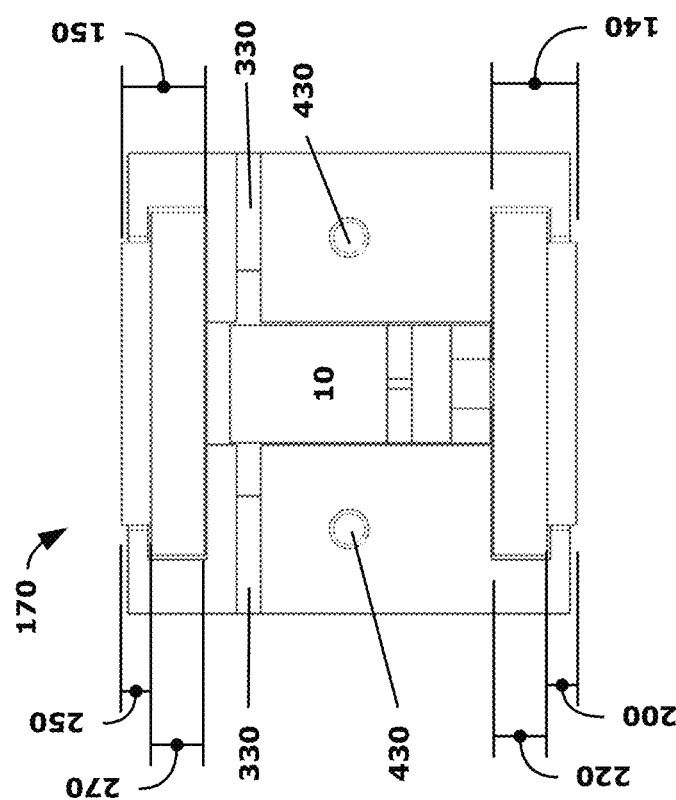
FIG. 30 shows a top view of the interior of the bottom portion of the case of FIG. 2 containing the conventional servo of FIG. 1 and with the front and rear rotating discs.
Figure 31:
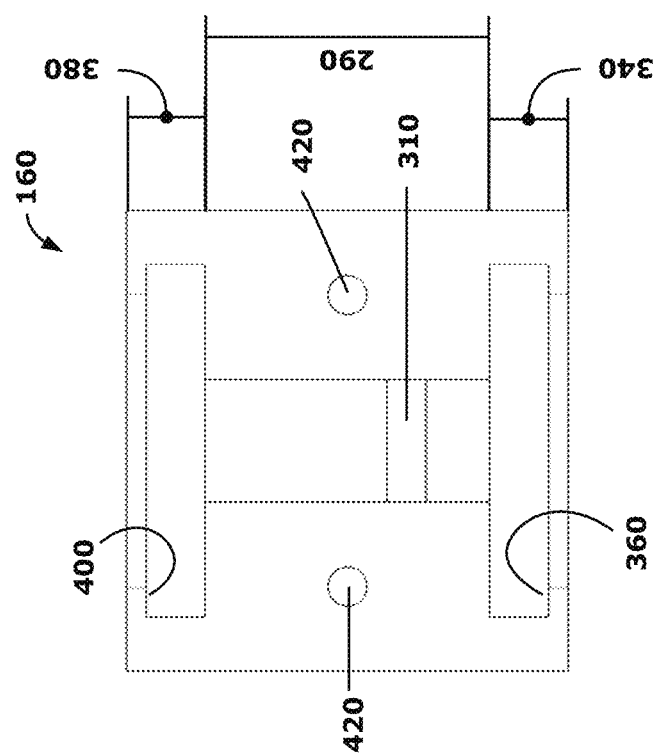
FIG. 31 shows a top view of the interior of the top portion of the case of FIG. 2 for mating with the bottom portion of the case shown in FIG. 30.
Figure 32:
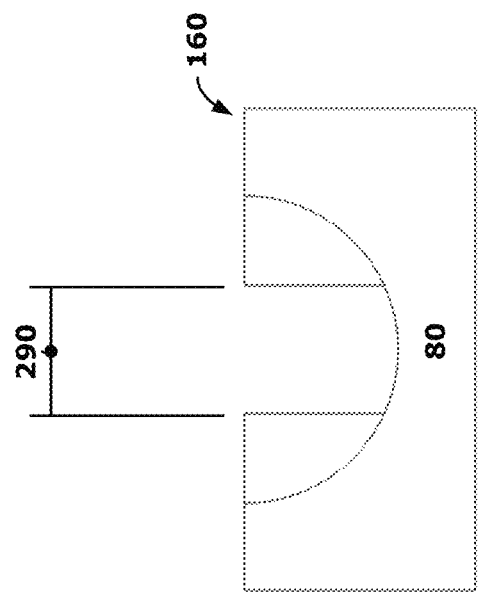
FIG. 32 shows a front view of the bottom portion of the case of FIG. 2 containing the conventional servo of FIG. 1 and with the front and rear rotating discs.
Figure 33:
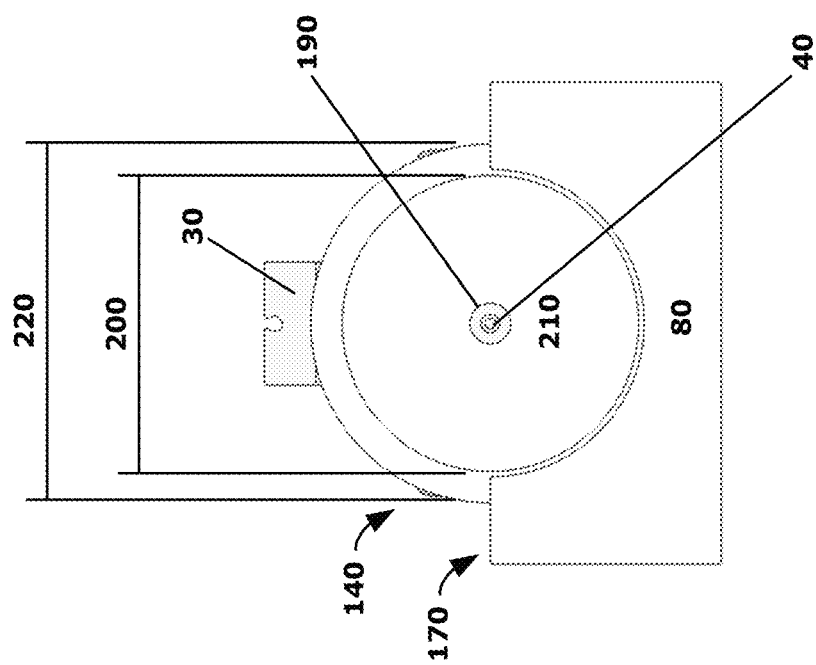
FIG. 33 shows a front view of the top portion of the case of FIG. 2 for mating with the bottom portion of the case shown in FIG. 32.
Figure 35:
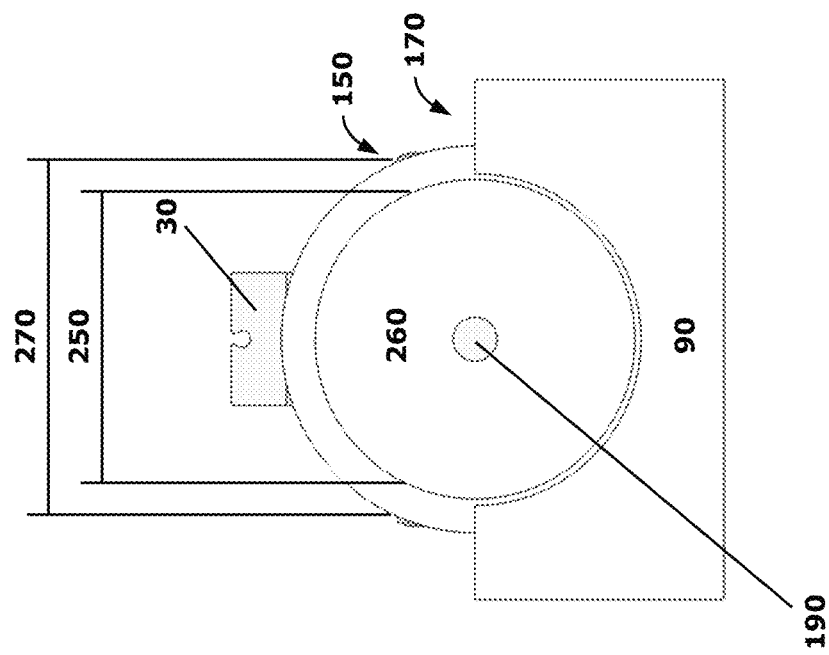
FIG. 35 shows a rear view of the bottom portion of the case of FIG. 2 containing the conventional servo of FIG. 1, with the front and rear rotating discs and for mating with top portion of the case shown in FIG. 34.
Figure 34:
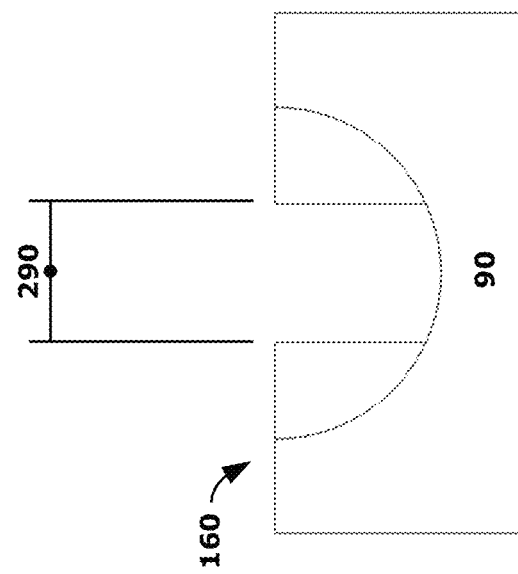
FIG. 34 shows a rear view of the top portion of the case of FIG. 2.
Figure 36:
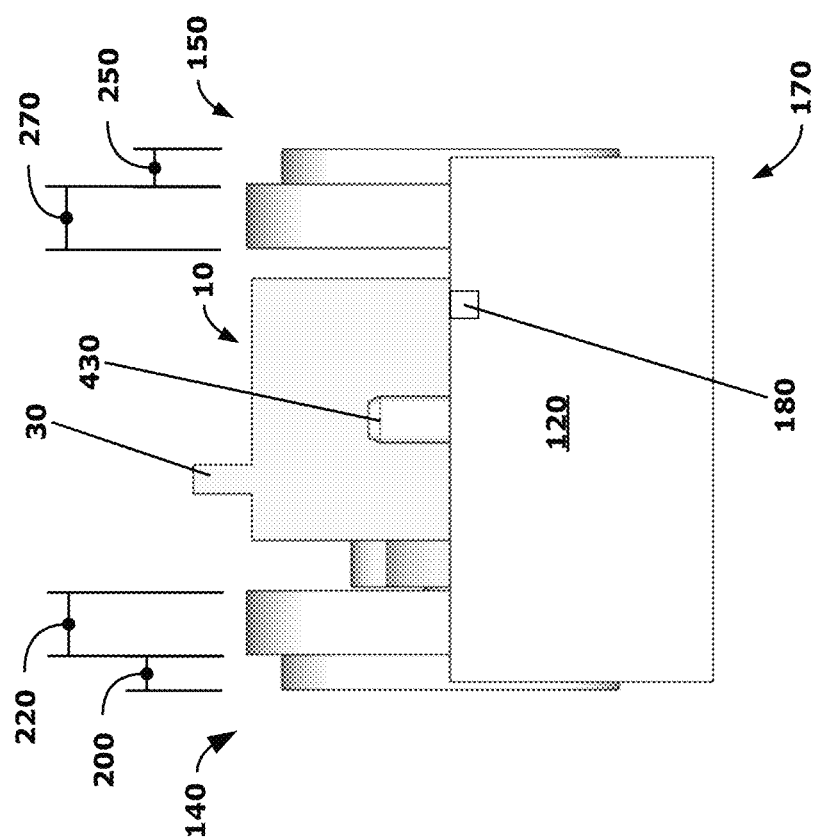
FIG. 36 shows a right-hand side view of the bottom portion of the case of FIG. 2 containing the conventional servo of FIG. 1 and with the front and rear rotating discs.
Figure 37:
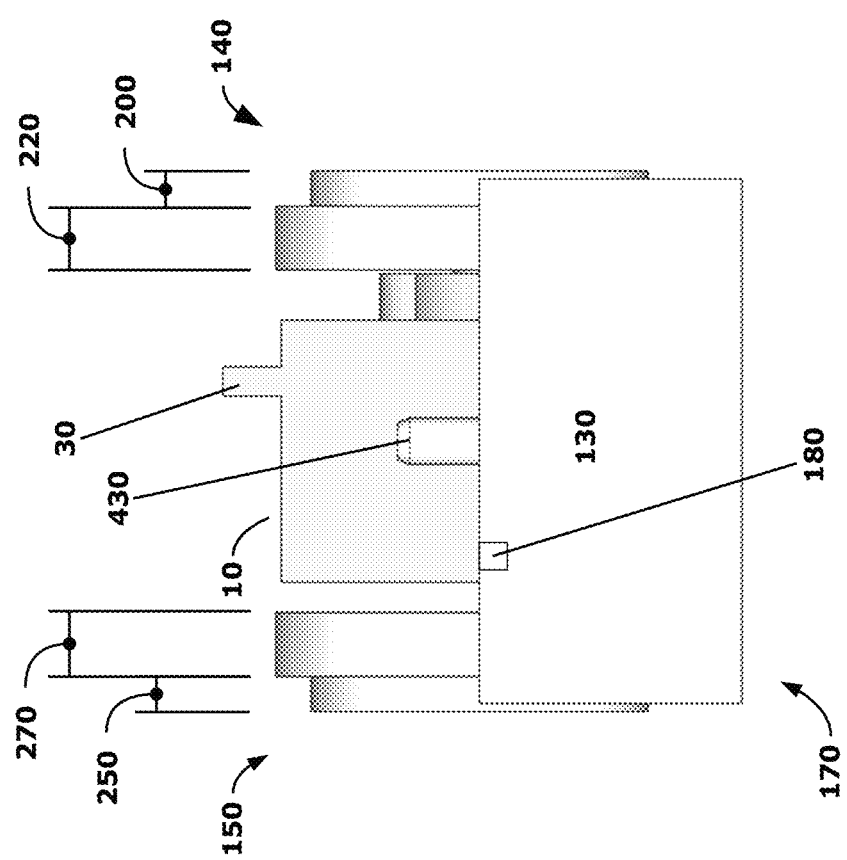
FIG. 37 shows a left-hand side view of the bottom portion of the case of FIG. 2 containing the conventional servo of FIG. 1 and with the front and rear rotating discs.

As discussed above, the servo case 70 comprises an enclosure which is configured or shaped to accept or receive at least a portion of a servo 10, such as, for example, but not limited to, a standard micro RC servo, such that the output shaft 40 of the servo 10 is engaged directly, or indirectly by way of its gear or arm/horn 50, with the front rotating disc 140 via cavity 240, which front rotating disc 140 is concentric with the central cylindrical bore in the front face 80 of the case 70. For example, the top and bottom portions 160 and 170 of case 70 comprise cavities 290 and 300, respectively which are configured to accept or receive and mount the servo 10, the top and bottom portion cavities 290 and 300 comprising recesses 310 and 320, respectively configured to accept or receive the mounting tabs 30 of the servo 10 and the channels 330 are configured to accept or receive the wires 60. When a servo 10 is inserted into servo case 70, the output shaft 40 of the servo 10, and thus the front rotating disc 140, may provide at least one linkage connection point and another at least one linkage connection point may be provided by the rear rotating disc 150 and thus collinearly with the output shaft 40 of the servo 10. In other words, the at least one linkage connection point provided by the front rotating disc 140 and the at least one linkage connection point provided by the rear rotating disc 150, each define a respective axis of rotation, which are arranged to be collinear, or in line to each other. In this example, the servo case 70 comprises two linkage connection points (or connector points 462 or 472 shown in FIG. 38), the front rotating disc 140 and the rear rotating disc 150, for connection of two respective bars or links of the upper linkages 460 or lower linkages 470. The connection point provided by the front rotating disc 140 is indirectly provided by the output shaft 40 of a servo 10, e.g., when the servo 10 is positioned in the servo case 70 as shown in FIG. 28. The two linkage connection points are provided by the front rotating disc 140 seated within the front bushing track 340/350 and projecting out through the central cylindrical bore in the front face 80 of the case 70 and by the rear rotating disc 150 seated within the rear bushing track 380/390 and projecting out through the central cylindrical bore in the rear face 90 of the case 70, respectively. The front surfaces 210 and 260 of the front and rear rotating discs 140 and 150, respectively, may provide a surface for connecting or mounting the link or bar of the upper linkage 460 and/or the lower linkage 470. The upper linkage 460 and the lower linkage 470 may be connected or mounted to the front and rear rotating discs 140 and 150 by any means known to persons skilled in this art, including but not limited to, by fasteners such as screws, nails, bolts etc. and adhesives.

The case 70 may include any number of fixing points, which may be used for fixing the legs 440 and 450 (via the case 70) to an external body, such as the pelvis or body of a robot. FIGS. 28, 30, 32, 35, 36 and 37 depict the case 70, with a standard servo 10 being positioned in the case 70. As discussed, the output shaft 40 of the servo 10 indirectly provides at least one of the linkage connection points, via the front rotating disc 140, and is collinear with the at least one linkage connection point provided by the rear rotating disc 150.

As discussed, case 70 may comprise at least two linkage connection points, which in this example are provided in the form of the front and rear rotating discs 140 and 150, respectively, the front rotating disc 140 directly engaged with the output shaft 40 of the servo 10 or indirectly engaged with output shaft 40 of the servo 10 by way of the gear or arm/horn 50 of the output shaft 40 of the servo 10, and being seated in its front bushing tracks 340/350 and projecting out through the central cylindrical bore in the front face 80 and the rear rotating disc 150 seated within its rear bushing track 380/390 and projecting out through the central cylindrical bore in the rear face 90, the front faces 210/260 of the front and rear rotating discs 140 and 150, respectively, being configured to connect with or mount a link or bar of the upper linkage 460 and/or lower linkage 470. It will be appreciated that in other examples, other types of linkage connection point arrangements may be used. Exemplary arrangements may include one or more shafts, bearings, bushings and/or other components suitable for allowing rotational motion.

As discussed, the output shaft 40 of the servo 10 supports an at least first linkage connection point via the front rotating disc 140. The output shaft 40 is supported by rotational bearings, which may be driven/operated by the servo 10, gearing and drive electronics to move to a commanded position. For example, the drive electronics may be configured to receive a signal requesting movement of the output shaft 40 to a commanded position and/or to actuate the output shaft 40 to rotate to the commanded position. In this example, at least the first linkage connection point provided by the output shaft 40 via the front rotating disc 140 is a driven servo rotating output shaft 40. In this example, at least the second linkage connection point is provided by the rear rotating disc 150, which is a freely passive rotating disc. In other examples, the servo 10 may comprise additional shafts, some of which may be freely rotating shafts whereas others may be driven servo rotating output shafts.

The at least two linkage connection points provided by the front and rear rotating discs 140 and 150 are collinear to each other and define an at least first pair of linkage connection points which shares a common rotational axis. FIG. 38 shows two legs 440 and 450, each comprising an upper linkage 460 which may be provided in the form of a two-bar linkage, and is configured to keep the knee joint (e.g., the middle case 70) parallel to the hip joint (e.g., the upper case 70). In this example, at least part of the upper linkage 460 can be moved nominally in the sagittal plane.

In another example, as shown in FIG. 38, the case 70 may provide four linkage connection points, two linkage connection points on each of the front and rear rotating discs 140 and 150. The four linkage connection points may define a first pair of linkage connection points and a second pair of linkage points. Each pair shares a common rotational axis, and the common rotational axes of the first and second pair are non-collinear to each other. In other words, the common rotational axis of the first pair of linkage connection points is offset or spaced from the common rotational axis of the second pair. The common rotational axis of the first pair of linkage connection points may be substantially parallel to the common rotational axis of the second pair. In this example, each leg 440 and 450 comprises an upper linkage 460 which, in one example, may be provided in the form of a four-bar linkage (not shown), and is configured to keep the knee joint (e.g., the middle case 70) parallel to the hip joint (e.g., the upper case 70). In this example, at least part of the upper linkage 460 can be moved nominally in the sagittal plane.

The knee joint (e.g., the middle case 70) itself may be a revolute joint, which is configured to move the lower link 470 with respect to the knee joint. In this example, the knee joint is configured to move in the sagittal plane, i.e., forward/back or flexion/extension. In other examples, the knee joint may be configured to move in the coronal plane, i.e., about an axis orthogonal to at least one axis of the hip joint - left/right or adduction/abduction. In still other examples, the knee joint may be configured to move in the transverse plane, i.e., twist or internal/external rotation.

In this example, the lower link 470 of each leg 440 and 450 may terminate in a foot or shoe 480. These point feet may simplify the interaction of the robot with the ground or reducing the risk of a foot becoming caught or obstructed. In another example, the lower link 470 of each leg 440 and 450 may be connected to a foot or shoe 480 by a joint. In such an example, the link between the lower link 470 of each leg 440 and 450 and its respective shoe 480 may be provided by a spherical joint with elastic elements, which extend in a direction substantially parallel to the body of the robot and may nominally return each shoe 480 to a position parallel to the body. This may result in the shoes 480 providing a greater weight bearing area and being adaptable to the contours of the terrain the robot is moving over. This may be useful, for example if the robot is walking over rubble or granular terrain.

In an exemplary method for producing locomotion of a legged robot or walking machine, the method includes actuating one or more servos 10 of a first leg 440 and a second leg 450 of the legged robot or walking machine. Actuation of the one or more servos 10 of the first and second legs 440 and 450 can result in movement of at least part of the upper linkage 460 and/or the lower linkage 470 of the first leg 440 and/or in movement of at least part of the upper linkage 460 and/or the lower linkage 470 of the second leg 450. Movement of at least part of the upper linkage 460 and/or the lower linkage 470 of the first and second legs 440 and 450, respectively can result or cause walking of the legged robot or walking machine.

The method includes actuating the hip joint (e.g., the upper case 70) of the first leg 440, e.g., to move at least part of the upper linkage 460 in a first direction (e.g., forward direction) in the sagittal plane (or coronal plane) of the legged robot or walking machine. This may lift the first leg 440 from a ground and/or lower the first leg 440 to a ground.

The method also includes actuating the hip joint (e.g., the upper case 70) of the second leg 450 to move at least part of the upper linkage 460 in a second direction (e.g., backward direction) in the sagittal plane (or coronal plane) of the legged robot or walking, e.g., while moving the first leg 440. The second direction is opposed to the first direction.

Subsequent to lowering the first leg 440 to the ground, the method includes actuating the hip joint (e.g., the upper case 70) of the second leg 450 to move at least part of the upper linkage 460 in the first direction in the sagittal plane (or coronal plane) of the legged robot or walking machine, e.g., to lift the second leg 450 from the ground and/or lower the second leg 450 to the ground.

Subsequent to lowering the first leg 440 to a ground, the method includes actuating the hip joint (e.g., the upper case 70) of the first leg 440 to move at least part of the upper linkage 460 in the second direction in the sagittal plane (or coronal plane) of the legged robot or walking machine, e.g. while moving the second leg 450.

The method further includes actuating the knee joint (e.g., the middle case 70) of the first leg 440 and/or the second leg 450 to move at least part of the lower linkage 470 of the first leg 440 and/or the second leg 450 in the coronal plane (or sagittal plane) of the legged robot or walking machine, when the first and second legs 440 and 45, respectively are in contact with the ground. Once the first leg 440 has been lowered to the ground, the step of actuating the knee joint of the first leg 440 and/or the second leg 450 includes actuating the knee joint of the first and second legs 440 and 450, respectively to move the lower linkage 470 of the first and second legs 440 and 450, respectively in the coronal plane (or sagittal plane) in a direction of the first leg 440. This may permit a weight or centre of mass of the legged robot or walking machine to be shifted from the second leg 450 to the first leg 440.

Once the second leg 450 has been lowered to the ground, the step of actuating the knee joint (e.g., the middle case 70) of the first leg 440 and/or the second leg 450, includes actuating the knee joint of the first and second legs 440 and 450 to move at least part of the lower linkage 470 of the first and second legs 440 and 450 in the coronal plane (or sagittal plane) in a direction of the second leg 450. This may permit the weight or centre of mass of the legged robot or walking machine to be shifted from the first leg 440 to the second leg 450.

It will be appreciated that the upper linkage 460 and/or the lower linkage 470 may be or include an upper two-bar linkage (as shown in FIG. 38), a lower two-bar linkage (as shown in FIG. 38), an upper four-bar linkage, a lower four-bar linkage, an upper pair of four-bar linkages and a lower pair of four-bar linkages, respectively. It will also be appreciated that at least part or all of the upper and/or lower linkages may move, in use. It will further be appreciated that the term linkage connection point encompasses a connector point and vice versa.

Each of legs 440 and 450, as illustrated in FIG. 38, comprise three servo cases 70. In an exemplary method for assembling legs 440 and 450 as illustrated in FIG. 38, and their subsequent incorporation into a walking robot or robot walking machine, the upper cases 70 are connected to a torso section. This connection may be made through stationary faces of the upper cases 70 or through the front rotating disc 140 and/or the rear rotating disc 150 of the upper cases 70. In an embodiment wherein the connection is made through the front rotating disc 140 and/or the rear rotating disc 150 of the upper cases 70, when the servo 10 of the upper case 70 is driven to rotate, the upper case 70 moves with respect to the torso section.

While only a single embodiment of the present invention have been shown and described, it is obvious that many changes and modifications may be made thereunto without departing from the scope of the invention as defined in the appended claims.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although some of the embodiments described herein are directed to servo, it will be appreciated by those skilled in the art that the teachings of the disclosure can be applied to other types of devices, without departing from the scope of the disclosure.

What is claimed is:

1. A case for a servo having a rotatable output shaft, the case comprising:

at least a partial interior volume or enclosure for enclosing at least a portion of the servo;

a front end having a front face comprising an aperture;

a front rotatable disc located at the front end, the front rotatable disc comprising a front portion having a front face, the front rotatable disc configured to directly or indirectly functionally engage the output shaft and to be rotated thereby; and a front bushing track located at the front end proximate the front face of the front end, wherein the front rotatable disc is seated for rotation in the front bushing track, and wherein at least a portion of the front portion of the front rotatable disc is located within, and extends through, the aperture and at least a portion of the front face of the rotatable disc projects out from the front face of the front end.

2. The case of claim 1, wherein the front rotatable disc further comprises a rear portion having a rear face.

3. The case of claim 2, wherein the rear comprises a boss or cavity configured to directly or indirectly functionally matingly engage the output shaft of the servo.

4. The case of claim 2, wherein the at least a portion of the rear portion is seated for rotation in the front bushing track.

5. The case of claim 1, wherein when at least a portion of the servo is enclosed by the case, the front rotatable disc is directly or indirectly functionally engaged with the output shaft, and when the servo is actuated to rotate the output shaft, the output shaft drives the front rotatable disc to rotate within the front bushing track.

6. The case of claim 1, further comprising a rear end having a rear face, a top end having a top face, a bottom end having a bottom face, a right-hand side having a right-hand side face, and a left-hand side having a left-hand side face.

7. The case of claim 1, provided by two mating portions, a top portion and a bottom portion.

8. The case of claim 7, wherein each of the top and bottom portions have formed therein the at least partial interior volume or enclosure for providing a mating fit of the servo therein.

9. The case of claim 8, wherein the at least partial interior volume or enclosure formed in the top portion and the at least partial interior volume or enclosure formed in the bottom portion are offset to allow for centering of the servo within the case based the offset of the output shaft of the servo.

10. The case of claim 8, wherein each of the at least partial interior volume or enclosure in the top and bottom portions have formed therein further cavities or recesses, which fit mounting tabs of the servo.

11. The case of claim 8, wherein the at least partial interior volume or enclosure in the bottom portion has formed therein means for fitting and guiding the power and control wires of the servo to the outside of the case.

12. The case of claim 11, wherein the means for fitting and guiding power and control wires of the servo to the outside of the case is selected from the group consisting of at least one aperture and a channel comprising apertures on the opposing right-hand and left-hand sides of the bottom portion for the power and control wires of the internal servo.

13. The case of claim 8, wherein each of the top and bottom portions, at the front end and near the front face of the front end, have formed therein the front bushing track, with a front shoulder for encasing and retaining at least a portion of the front rotating disc which is driven by the shaft of the servo.

14. The case of claim 8, wherein the front rotating disc is seated within the front bushing track created by the mating of the top and bottom portions.

15. The case of claim 8, wherein the front rotating disc is situated within the front bushing track such that at least a portion of the front rotating disc is seated in the portion of the front bushing track created by a front shoulder.

16. The case of claim 1 comprising a surface configured to provide one or more connector points for connection of a link, wherein the one or more connector points are configured to movably connect the link to the case.

17. The case of claim 16, wherein surface is the front face of the front rotatable disc.

18. The case of claim 16, wherein the one or more connector points are at least two connector points for connection of at least two respective links of a linkage, the at least two connector points being arranged on the case such that the two connector points define at least two respective axes of rotation, the at least two axes of rotation being arranged to be collinear to each other.

19. The case of claim 18, wherein the case comprises at least two other connector points for connection of at least two other respective links of a linkage, the at least two other connector points being arranged on the case such that the two other connector points define at least two other respective axes of rotation, the two other axes of rotation being arranged to be non-collinear to each other.

20. The case of claim 16, configured to fix or be affixed to at least a portion of the servo by a friction fit and/or by one or more mechanical fixings and when at least a portion of the servo is surrounded or enclosed by the case, the surface is the output shaft of the servo.

21. A case for a servo having a rotatable output shaft, the case comprising:
  at least a partial interior volume or enclosure for enclosing at least a portion of the servo;
  a front end having a front face comprising an aperture;
  a front rotatable disc located at the front end, the front rotatable disc configured to directly or indirectly functionally engage the output shaft and to be rotated thereby; and
  a front bushing track located at the front end proximate the front face;
  wherein at least a rear portion of the front rotatable disc is seated for rotation in the front bushing track; and
  wherein at least a portion of a front portion of the front rotatable disc, and thus at least a portion of a front face of the front portion, extends through the aperture in the front face of the front end, and projects out from the front face of the front end.

22. A case for a servo having a rotatable output shaft, the case comprising:
  at least a partial interior volume or enclosure for enclosing at least a portion of the servo;
  a front end having a front face; and
  a front rotatable disc located at the front end, at least a portion of the front rotatable disc projecting out from the front face of the front end, the front rotatable disc configured to directly or indirectly functionally engage the output shaft and to be rotated thereby; and
  wherein when at least a portion of the servo is enclosed by the case, the front rotatable disc is directly or indirectly functionally engaged with the output shaft, and when the servo is actuated to rotate the output shaft, the output shaft drives the front rotatable disc to rotate.

23. A case for a servo having a rotatable output shaft, the case comprising:

at least a partial interior volume or enclosure for enclosing at least a portion of the servo;

a front end having a front face comprising an aperture; and a front rotatable disc located at the front end, the front rotatable disc configured to directly or indirectly functionally engage the output shaft and to be rotated thereby; and wherein the case is provided by two mating portions, a top portion and a bottom portion, wherein each of the top and bottom portions have formed therein the at least partial interior volume or enclosure for providing a mating fit of the servo therein; and wherein at least a portion of a front portion of the front rotatable disc, and thus at least a portion of a front face of the front portion, extends through the aperture in the front face of the front end, and projects out from the front face of the front end, and wherein the at least partial interior volume or enclosure in the bottom portion has formed therein means for fitting and guiding power and control wires of the servo to the outside of the case.

\* \* \* \* \*